(12) United States Patent
Yamashita et al.

(10) Patent No.: US 7,974,752 B2
(45) Date of Patent: Jul. 5, 2011

(54) STEERING ASSISTANCE DEVICE FOR VEHICLE

(75) Inventors: Masaharu Yamashita, Nishikamo-gun (JP); Shuji Fujita, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 783 days.

(21) Appl. No.: 11/913,902

(22) PCT Filed: Jul. 3, 2006

(86) PCT No.: PCT/JP2006/313625
§ 371 (c)(1),
(2), (4) Date: Nov. 8, 2007

(87) PCT Pub. No.: WO2007/007694
PCT Pub. Date: Jan. 18, 2007

(65) Prior Publication Data
US 2009/0069979 A1 Mar. 12, 2009

(30) Foreign Application Priority Data
Jul. 8, 2005 (JP) ................................. 2005-200520

(51) Int. Cl.
*A01B 69/00* (2006.01)
(52) U.S. Cl. ............. 701/41; 701/42; 180/6.2; 180/6.28
(58) Field of Classification Search .................... 701/14, 701/42, 41; 180/6.2, 6.28; 280/1.202, 5.51
See application file for complete search history.

(56) References Cited

U.S. PATENT DOCUMENTS
6,032,757 A * 3/2000 Kawaguchi et al. .......... 180/446

2002/0005314 A1* 1/2002 Takehara et al. ............. 180/443
2003/0052639 A1* 3/2003 Tanaka et al. ................. 318/632
2004/0055810 A1* 3/2004 Chabaan ....................... 180/446
2004/0140148 A1* 7/2004 Nishizaki et al. ............. 180/443

FOREIGN PATENT DOCUMENTS
| JP | 4-71959 | 3/1992 |
| JP | 5-229443 | 9/1993 |
| JP | 6-4417 | 1/1994 |
| JP | 7-196048 | 8/1995 |
| JP | 8-67266 | 3/1996 |
| JP | 8-72732 | 3/1996 |
| JP | 08085470 A * | 4/1996 |

(Continued)

*Primary Examiner* — Mark Hellner
*Assistant Examiner* — Helal A Algahaim
(74) *Attorney, Agent, or Firm* — Oblon, Spivak, McClelland, Maier & Neustadt, L.L.P.

(57) ABSTRACT

A steering assist apparatus for a vehicle includes an electric motor for steering assist. Rotation output of the electric motor is reduced in speed by a ball-screw mechanism and converted to rectilinear motion, which is transmitted to a rack bar. An electronic control unit determines a target current value in accordance with a steering torque detected by a steering torque sensor and a vehicle speed detected by a vehicle speed sensor. While using an actual current value of the electric motor detected by a current sensor as a feedback, the electronic control unit controls the current flowing through the electric motor to be equal to the target current value. The electronic control unit changes the feedback gain of the feedback control in accordance with a steering angle detected by a steering angle sensor, to thereby suppress abnormal noise generated at a steering mechanism, without deteriorating steering feel.

16 Claims, 23 Drawing Sheets

FOREIGN PATENT DOCUMENTS

| | | |
|---|---|---|
| JP | 8-332969 | 12/1996 |
| JP | 10-264838 | 10/1998 |
| JP | 11-321691 | 11/1999 |
| JP | 2001-114121 | 4/2001 |
| JP | 2001-171533 | 6/2001 |
| JP | 2003-26022 | 1/2003 |
| JP | 2003-118617 | 4/2003 |
| JP | 2004-338696 | 12/2004 |
| JP | 2005-22468 | 1/2005 |
| JP | 2005-170283 | 6/2005 |
| RU | 2 185 301 C2 | 7/2002 |
| RU | 43 837 U1 | 2/2005 |

* cited by examiner

FIG.9
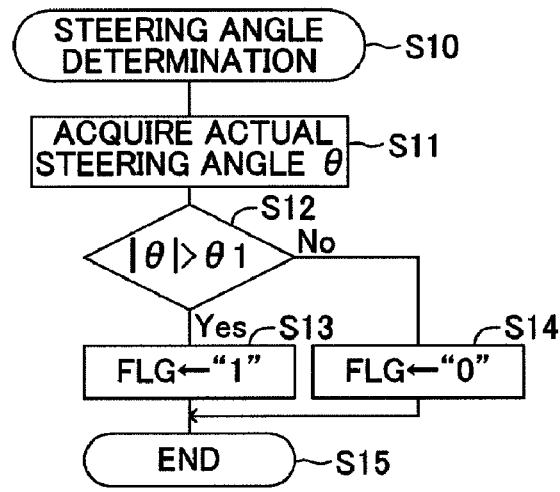
FIG.10
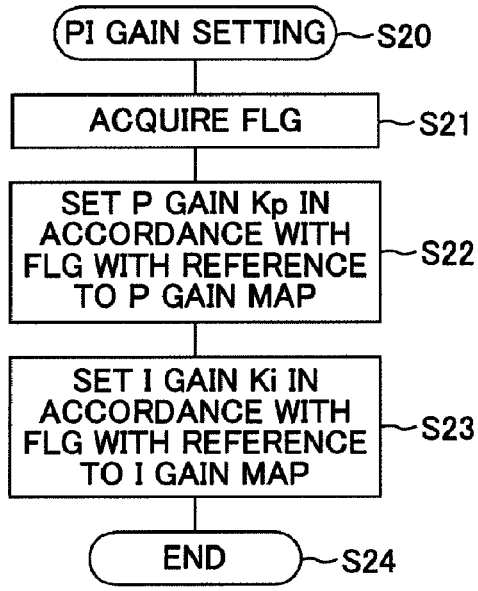
FIG.11
| | FLG="0" | FLG="1" |
|---|---|---|
| P GAIN | Kp1 | Kp2 |
| I GAIN | Ki1 | Ki2 |
ORDINARY CONSTANT ↗     ↑ ABNORMAL NOISE COPING CONSTANT

STEERING ASSISTANCE DEVICE FOR VEHICLE

TECHNICAL FIELD

The present invention relates to a steering assist apparatus for a vehicle which imparts assist force generated by an electric motor to steering of steerable wheels performed through rotation of a steering wheel.

BACKGROUND ART

From the past, as shown in Japanese Patent Publication (kokoku) No. H6-4417, a steering assist apparatus of such a type is known to be configured such that in order to prevent unnecessary drive and control of the electric motor, assist torque generated by the electric motor is reduced or generation of assist torque is stopped by lowering the control voltage applied to the electric motor when the rack bar reaches the vicinity of its stroke end.

DISCLOSURE OF THE INVENTION

However, in general, in a state where the steering wheel has been steered to a large steering angle, a large steering torque is needed so as to rotate the steering wheel. Therefore, if assist torque generated by the electric motor is reduced or generation of assist torque is stopped when the rack bar reaches the vicinity of its stroke end as in the above-described conventional technique, a driver feels unnatural sensation in steering operation of the steering wheel, so that steering feel deteriorates. The present invention addresses the problem of deterioration of steering feel and the problem of generation of abnormal noise at a steering mechanism portion from the steering wheel to the steerable wheels.

In general, in a state where the steering wheel has been steered by a great amount, since the steering assist force is large, the electric motor outputs a large torque. In addition, since the change rate of current flowing through the electric motor is large, the variation of the output torque of the electric motor is large. Accordingly, in this state, abnormal noise becomes likely to be generated in the steering mechanism because of the difference between the responsiveness of the output torque of the electric motor and the operation responsiveness of the steering mechanism. More specifically, in a case where control for the electric motor is tuned in accordance with the characteristics of the steering mechanism such that, within a range of ordinary steering angle, no abnormal noise is generated in the steering mechanism in a state where the control responsiveness of the electric motor is rendered high, when the steering angle becomes large, overcompensation occurs in operation of the steering mechanism for a large variation in the output torque of the electric motor, and abnormal noise is generated. Meanwhile, in a case where the control for the electric motor is tuned in accordance with the characteristics of the steering mechanism such that, within the range of ordinary steering angle, no abnormal noise is generated in the steering mechanism in a state where the control responsiveness of the electric motor is rendered low, when the steering angle becomes large, a remarkable delay occurs in response of the output torque of the electric motor in relation to operation of the steering mechanism. In this case as well, a large abnormal noise is generated.

The present invention has been accomplished in order to cope with the above-described problem, and an object of the present invention is to provide a steering assist apparatus for a vehicle which suppresses generation of abnormal noise by a steering mechanism without deteriorating steering feel.

In order to achieve the above-mentioned object, the present invention provides a steering assist apparatus for a vehicle which includes an electric motor for imparting assist force to steering of steerable wheels performed through rotation of a steering wheel, wherein feedback control is performed, while an actual control quantity of the electric motor is used as a feedback, such that the electric motor operates in accordance with a target control quantity, the steering assist apparatus being characterized by comprising steering angle detection means for detecting steering angle of the steering wheel; and gain changing means for changing a feedback gain used in the feedback control in accordance with the detected steering angle. In this case, the feedback gain may be a control gain regarding at least one of a proportional term or an integral term associated with the feedback control.

The gain changing means may be configured such that when the detected steering angle is large, the feedback gain is changed to a smaller value as compared with the case where the detected steering angle is small, to thereby reduce abnormal noise which is generated due to high responsiveness of the feedback control. Alternatively, the gain changing means may be configured such that when the detected steering angle is large, the feedback gain is changed to a larger value as compared with the case where the detected steering angle is small, to thereby reduce abnormal noise which is generated due to low responsiveness of the feedback control.

The target control quantity of the electric motor may be a target current value, which represents target current to be supplied to the electric motor. In this case, the actual control quantity of the electric motor is an actual current value, which represents current flowing through the electric motor and detected by means of a current sensor. Preferably, the steering assist apparatus for a vehicle further comprises steering torque detection means for detecting steering torque applied to the steering wheel; vehicle speed detection means for detecting vehicle speed; and target-control-quantity determination means for determining the target control quantity of the electric motor in accordance with the detected steering torque and vehicle speed, whereby the target control quantity of the electric motor is determined by the steering torque and the vehicle speed.

According to the feature of the present invention, the gain-changing means changes the feedback gain used in the feedback control in accordance with the steering angle. Specifically, the gain changing means changes the feedback gain such that when the steering angle of the steering wheel is large, the feedback gain is changed to a smaller value as compared with the case where the steering angle is small, to thereby reduce abnormal noise which is generated due to high responsiveness of the feedback control. Alternatively, the gain changing means changes the feedback gain such that when the steering angle of the steering wheel is large, the feedback gain is changed to a larger value as compared with the case where the steering angle is small, to thereby reduce abnormal noise which is generated due to low responsiveness of the feedback control. By virtue of changing the feedback gain, a control quantity used to make the actual control quantity of the electric motor approach the target control quantity is changed without changing the target control quantity, whereby the rate of change of the electric motor from the current state to a state corresponding to the target control quantity is controlled to decrease or increase when the steering angle becomes large and the output torque of the electric motor becomes large.

As a result, even when the steering angle becomes large, a control quantity for the electric motor required in a state where the steering angle is large is secured. Therefore, steering feel does not deteriorate. Further, as a result of the control of changing the feedback gain in accordance with the steering angle, generation of abnormal noise due to the difference between the responsiveness of the output torque of the electric motor and the responsiveness of the steering mechanism can be avoided. Specifically, in a case where the control for the electric motor is tuned in accordance with the characteristics of the steering mechanism such that, within a range of ordinary steering angle, no abnormal noise is generated in the steering mechanism in a state where the control responsiveness of the electric motor is rendered high, when the steering angle increases, the control quantity fed back to the electric motor is controlled to decrease, and the output torque of the electric motor becomes difficult to change, so that generation of abnormal noise due to overcompensation of the steering mechanism is suppressed. Meanwhile, in a case where the control for the electric motor is tuned in accordance with the characteristics of the steering mechanism such that, within the range of ordinary steering angle, no abnormal noise is generated in the steering mechanism in a state where the control responsiveness of the electric motor is rendered low, when the steering angle increases, the control quantity fed back to the electric motor is controlled to increase, and the output torque of the electric motor becomes easy to change, so that no response delay is produced in the output torque of the electric motor in relation to operation of the steering mechanism, whereby generation of abnormal noise is suppressed.

A second feature of the present invention resides in that the gain changing means changes the feedback gain from a first feedback gain to a second feedback gain when the steering angle detected by the steering angle detection means becomes greater than a predetermined steering angle, and there are further provided steering speed detection means for detecting steering speed of the steering wheel; and gain-change control means for permitting the gain changing means to change the feedback gain when the steering speed detected by the steering speed detection means is lower than a predetermined steering speed and prohibiting the gain changing means from changing the feedback gain when the detected steering speed is equal to or higher than the predetermined steering speed.

When the steering wheel is steered abruptly in a state where the steering angle is large, a sharp voltage (current) increase is required in some cases. If the feedback gain is switched in such a state, the control responsiveness of the electric motor changes abruptly and excessively, and abnormal noise may be generated and a failure may occur in the steering mechanism. However, according to the second feature of the present invention, sharp changes of drive current supplied to the electric motor are suppressed, and generation of abnormal noise and a failure in the steering mechanism associated with an abrupt change in the control responsiveness of the electric motor can be prevented.

A third feature of the present invention resides in that hysteresis is imparted to the feedback-gain changing control performed by the gain changing means and the gain-change control means in accordance with changes in the steering angle detected by the steering angle detection means and the steering speed detected by the steering speed detection means. By virtue of this configuration, the frequency of switching the feedback gain for changes in the steering angle and the steering speed can be reduced. As a result, frequent switching of the feedback gain; that is, frequent switching of drive current supplied to the electric motor, is mitigated, whereby generation of abnormal noise at the steering mechanism can be suppressed more effectively.

A fourth feature of the present invention resides in that the gain changing means changes the feedback gain from a first feedback gain to a second feedback gain when the steering angle detected by the steering angle detection means becomes greater than a predetermined steering angle; the target current value decreases as the vehicle speed increases; and there is further provided gain-change control means for permitting the gain changing means to change the feedback gain when current flowing through the electric motor is greater than a predetermined current and prohibiting the gain changing means from changing the feedback gain when the current flowing through the electric motor is equal to or less than the predetermined current. In this case, the target current value or the actual current value may be used as the current flowing through the electric motor.

Even when the steering angle of the steering wheel is large, if the current flowing through the electric motor is small, the feedback gain is not switched. In other words, even when the steering angle of the steering wheel is large if the vehicle speed is high, the feedback gain is not switched. As a result, even when the feedback gain is set so as to prevent generation of abnormal noise from the steering mechanism during periods in which the vehicle stops or travels at very low speed and the steering wheel is steered greatly, the feedback gain is not switched during periods in which the vehicle travels at high speed, whereby deterioration of steering feel can be prevented.

A fifth feature of the present invention resides in that hysteresis is imparted to the feedback-gain changing control performed by the gain changing means and the gain-change control means in accordance with changes in the steering angle detected by the steering angle detection means and the current flowing through the electric motor. By virtue of this configuration, the frequency of switching the feedback gain for changes in the steering angle and the current flowing through the electric motor can be reduced. As a result, frequent switching of the feedback gain; that is, frequent switching of drive current supplied to the electric motor, is mitigated, whereby generation of abnormal noise at the steering mechanism can be suppressed more effectively.

A sixth feature of the present invention resides in that the gain changing means changes the feedback gain from a first feedback gain to a second feedback gain when the steering angle detected by the steering angle detection means becomes greater than a predetermined steering angle; and there are provided current-change-rate detection means for detecting, as a current change rate, the ratio of a change rate of the current flowing through the electric motor to a change rate of the steering torque detected by the steering torque detection means, and gain-change control means for permitting the gain changing means to change the feedback gain when the current change rate detected by the current-change-rate detection means is greater than a predetermined change rate and prohibiting the gain changing means from changing the feedback gain when the detected current change rate is equal to or less than the predetermined change rate. In this case as well the target current value or the actual current value may be used as the current flowing through the electric motor.

The current change rate represents the magnitude of change in torque generated by the electric motor for a required assist torque; i.e., a state where abnormal noise is likely to be generated, by an increase in its value. When the current change rate is small, the switching of the feedback gain by the gain changing means is prohibited, and when the current change rate becomes large, the switching of the feedback gain by the gain changing means is permitted. As result, the feedback gain become more likely to be switched in a state where abnormal noise is likely to be generated, whereby reduction of abnormal noise and good steering feel are realized simultaneously.

A seventh feature of the present invention resides in that hysteresis is imparted to the feedback-gain changing control performed by the gain changing means and the gain-change control means in accordance with changes in the steering angle detected by the steering angle detection means and the current change rate detected by the current-change-rate calculation means. By virtue of this configuration, the frequency of switching the feedback gain for changes in the steering angle and the current change rate can be reduced. As a result, frequent switching of the feedback gain; that is, frequent switching of drive current supplied to the electric motor, is mitigated, whereby generation of abnormal noise at the steering mechanism can be suppressed more effectively.

An eighth feature of the present invention resides in that the gain changing means changes the feedback gain from a first feedback gain to a second feedback gain when the steering angle detected by the steering angle detection means becomes greater than a predetermined steering angle; and there is provided gain-change control means for permitting the gain changing means to change the feedback gain when the vehicle speed detected by the vehicle speed detection means is lower than a predetermined vehicle speed and prohibiting the gain changing means from changing the feedback gain when the vehicle speed is equal to or higher than the predetermined vehicle speed.

By virtue of this configuration, even when the steering angle of the steering wheel is large, if the vehicle speed is high, the feedback gain is not switched. As a result, even when the feedback gain is set so as to prevent generation of abnormal noise from the steering mechanism during periods in which the vehicle stops or travels at very low speed and the steering wheel is steered greatly, the feedback gain is not switched during periods in which the vehicle travels at high speed, whereby deterioration of steering feel can be prevented.

A ninth feature of the present invention resides in that hysteresis is imparted to the feedback-gain changing control performed by the gain changing means and the gain-change control means in accordance with changes in the steering angle detected by the steering angle detection means and the vehicle speed detected by the vehicle speed detection means. By virtue of this configuration, the frequency of switching the feedback gain for changes in the actual steering angle and the vehicle speed can be reduced. As a result, frequent switching of the feedback gain; that is, frequent switching of drive current supplied to the electric motor, is mitigated, whereby generation of abnormal noise at the steering mechanism can be suppressed more effectively.

A tenth feature of the present invention resides in that the gain changing means includes low-pass-filer processing means for performing low-pass-filter processing for the feedback gain changed in accordance with the steering angle. By virtue of this configuration, the feedback gain gradually changes after being switched, so that even when the feedback gain is changed by the gain changing means, the response characteristic of assist force generated by the electric motor changes smoothly, so that the driver does not feel any unnatural sensation when he rotates the steering wheel.

BRIEF DESCRIPTION OF THE DRAWINGS

FIG. 9 is a flowchart showing a steering angle determination program executed in a steering angle determination section of FIG. 8.

FIG. 10 is a flowchart showing a PI gain setting program executed in a PI gain setting section of FIG. 8.

FIG. 11 is a table used for explaining a memory map which stores P gains and I gains.

BEST MODE FOR CARRYING OUT THE INVENTION

Figure 1:
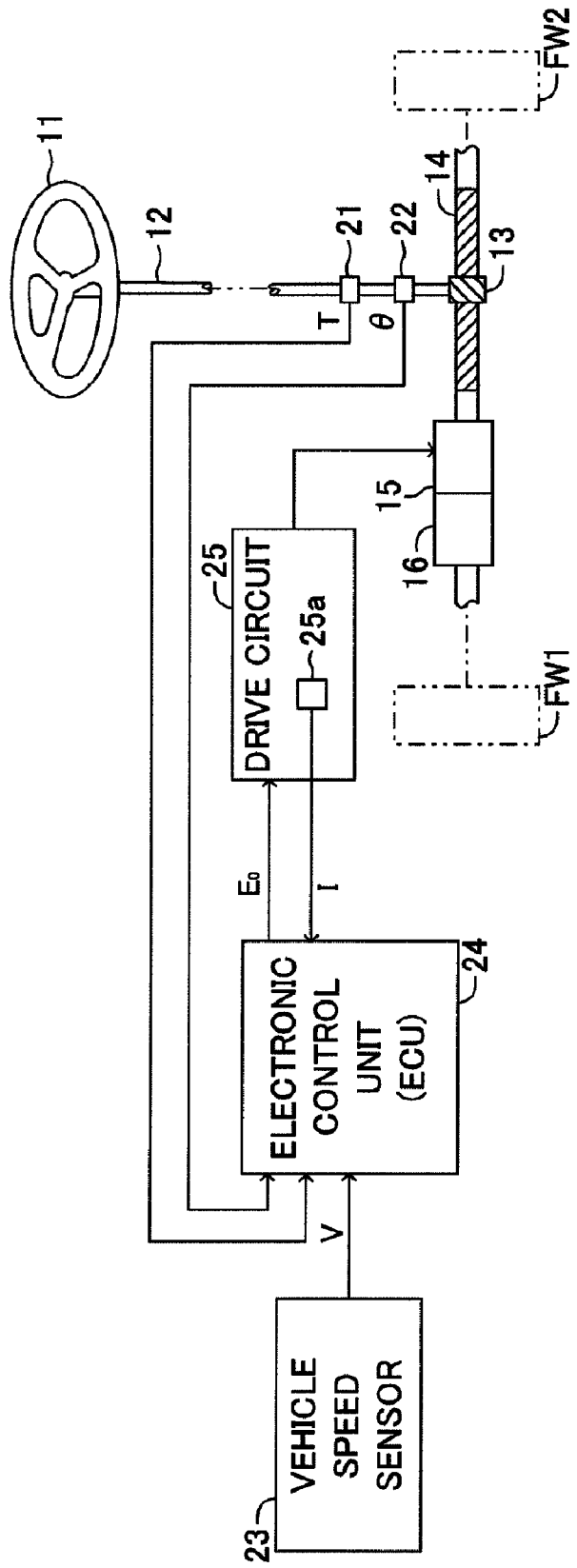
FIG. 1 is an overall schematic diagram of a steering apparatus for a vehicle having a steering assist function according to an embodiment of the present invention.

An embodiment of the present invention will now be described while referring to the drawings. FIG. 1 is a schematic diagram showing the entirety of a steering apparatus for a vehicle which includes a steering assist apparatus according to the present invention.

This steering apparatus for a vehicle includes a steering shaft 12, an upper end of which is connected to a steering wheel 11 such that the steering shaft 12 rotates together with the steering wheel 11. A pinion gear 13 is connected to a lower end of the steering shaft 12 such that the pinion gear 13 rotates together with the steering shaft 12. The pinion gear 13 is in meshing engagement with rack teeth formed on a rack bar 14 to thereby form a rack and pinion mechanism. Left and right front wheels FW1 and FW2 are steerably connected to opposite ends of the rack bar 14 via unillustrated tie rods and knuckle arms. The left and right front wheels FW1 and FW2 are steered leftward or rightward in accordance with an axial displacement of the rack bar 14 caused by rotation of the steering shaft 12 about its axis.

An electric motor 15 for steering assist is assembled to the rack bar 14. The electric motor 15 is connected to the rack bar 14 via a ball-screw mechanism 16 in a power transmissible manner. The electric motor 15 assists steering of the left and right front wheels FW1 and FW2 through rotation thereof. The ball-screw mechanism 16, which functions as a speed reducer and a rotation-rectilinear motion converter, converts rotational motion of the electric motor 15 to rectilinear motion, while reducing the rotational speed, and transmits the rectilinear motion to the rack bar 14. In place of assembling the electric motor 15 to the rack bar 14, the electric motor 15 may be assembled to the steering shaft 12 in such a manner as to transmit rotation of the electric motor 15 to the steering shaft 12 via a speed reducer, to thereby drive the steering shaft 12 about its axis.

Next, an electric control apparatus which controls operation of the electric motor 15 will be described. The electric control apparatus includes a steering torque sensor 21, a steering angle sensor 22, and a vehicle speed sensor 23. The steering torque sensor 21 is assembled to the steering shaft 12 and adapted to detect steering torque T which acts on the steering shaft 12 as a result of an operation of rotating the steering wheel 11. The steering torque T assumes a positive or negative value depending on whether the left and right front wheels FW1 and FW2 are steered rightward or leftward, and the magnitude of the positive or negative value represents the magnitude of the steering torque T. Instead of assembling the steering torque sensor 21 to the steering shaft 12 the steering torque sensor 21 may be assembled to the rack bar 14 so as to detect the steering torque T from an amount of distortion of the rack bar 14 in the axial direction.

The steering angle sensor 22 is assembled to the steering shaft 12 and adapted to detect actual steering angle θ of the steering wheel 11 by detecting rotational angle of the steering shaft 12. The actual steering angle θ assumes a positive or negative value depending on whether the steering wheel 11 is rotated clockwise or counterclockwise, and the magnitude of the positive or negative value represents the magnitude of the actual steering angle θ. Instead of assembling the steering angle sensor 22 to the steering shaft 12, the steering angle sensor 22 may be assembled to the rack bar 14 so as to detect the actual steering angle θ from an amount of displacement of the rack bar 14 in the axial direction. Further, since the rotational angle of the electric motor 15 is proportional to the actual steering angle θ, the actual steering angle θ may be detected from the rotational angle of the electric motor 15. Notably, since the actual steering angle θ is proportional to the steering angle of the left and right front wheels FW1 and FW2, similar detection can be performed through employment of the steering angle of the left and right front wheels FW1 and FW2. The vehicle speed sensor 23 detects vehicle speed V.

The steering torque sensor 21, the steering angle sensor 22, and the vehicle speed sensor 23 are connected to an electronic control unit 24. The electronic control unit 24 is mainly formed by a microcomputer composed of a CPU, ROM, RAM, etc. The electronic control unit 24 drives the electric motor 15 via a drive circuit 25 by means of various computer program controls to be described later. The drive circuit 25 receives a control voltage value $E_0$ from the electronic control unit 24 and supplies to the electric motor 15 a current proportional to the control voltage value $E_0$, to thereby cause the electric motor 15 to generate an assist torque proportional to the control voltage value $E_0$. A current sensor 25a is provided in the drive circuit 25. The current sensor 25a detects actual current value I, which represents the magnitude of current flowing through the electric motor 15, and supplies the same to the electronic control unit 24.

The above is the example hardware configuration of the steering apparatus for a vehicle according to the present invention. Various control examples will be described successively. In these control examples, in response to an ignition switch being turned on, the CPU within the electronic control unit 24 executes a program stored in the ROM to thereby control rotation of the electric motor 15. In the following descriptions of the control examples, the programs executed by the CPU are each represented by a functional block diagram.

a. First Control Example

Figure 2:
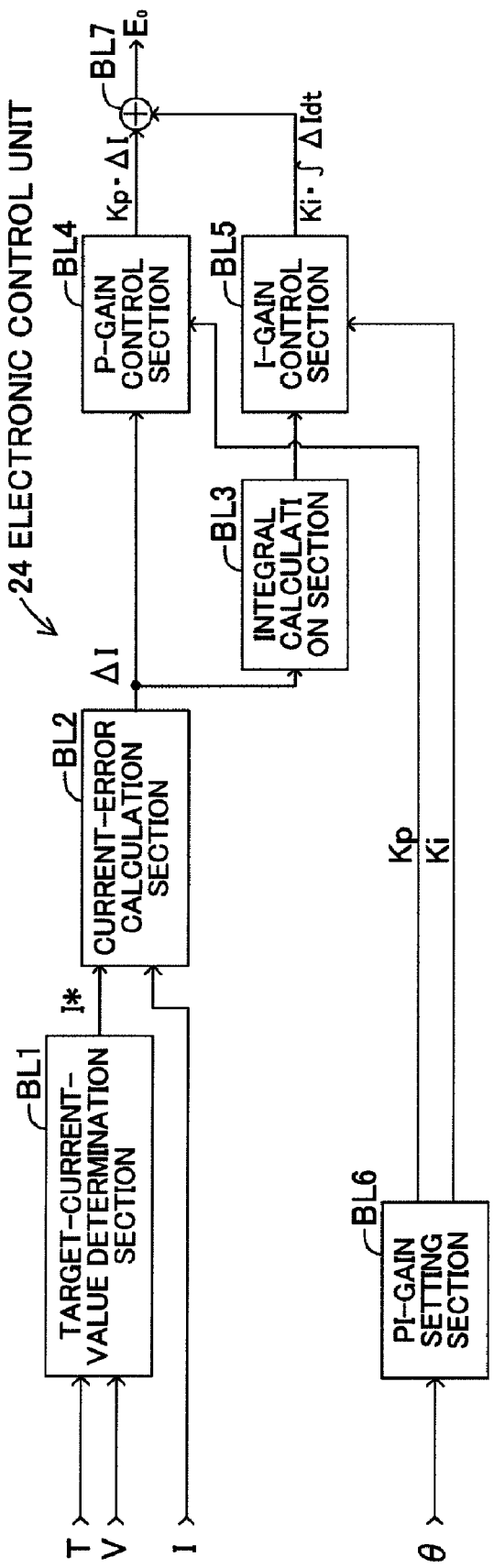
FIG. 2 relates a first control example of the present invention and shows a functional block diagram of an electronic control unit of FIG. 1.
Figure 3:
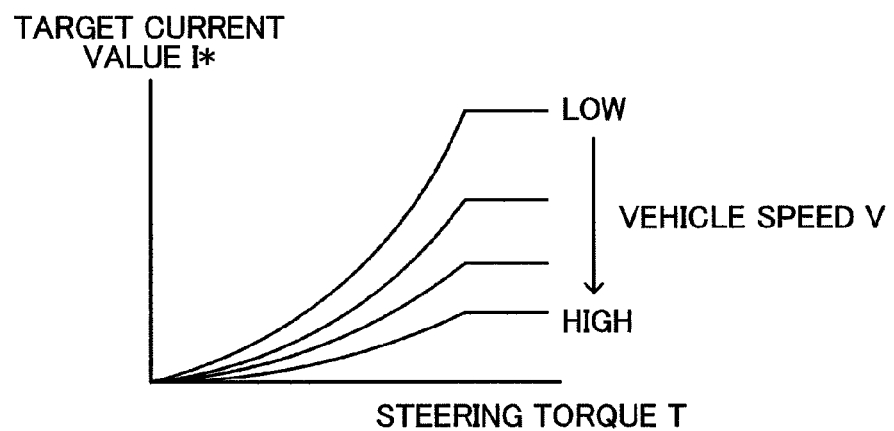
FIG. 3 is a graph showing a relation among steering torque vehicle speed, and target current value.

First, a first control example will be described in detail with reference to the drawings, FIG. 2 is a functional block diagram of the electronic control unit 24 according to this first control example. A target-current-value determination section BL1 determines a target current value I*, which changes in accordance with the steering torque T and the vehicle seed V, while referring to a target-current-value table by use of the steering torque T detected by the steering torque sensor 21 and the vehicle speed V detected by the vehicle speed sensor 23. This target-current-value table is previously stored in the ROM in the electronic control unit 24. As shown in FIG. 3, for each of a plurality of representative vehicle speeds, the target-current-value table stores a target current value I* which increases non-linearly with the steering torque T. For a given steering torque T, the lower the vehicle speed V, the greater the target current value I*. Notably, instead of utilizing this target-current-value table, the target current value I* may be calculated by use of a previously prepared function which represents the target current value I*, which changes in accordance with the steering torque T and the vehicle speed V.

The thus-determined target current value I* is supplied to a current-error calculation section BL2. This current-error calculation section BL2 receives the actual current value I detected by the current sensor 25a. The current-error calculation section BL2 calculates current error $\Delta I$ (=I*−I) by subtracting the actual current value I from the target current value I*, and supplies the current error $\Delta I$ to an integral calculation section BL3 and a P-gain control section BL4 (i.e., proportional-term-gain control section BL4). The integral calculation section BL3 performs integral calculation on the current error $\Delta I$, which changes with elapse of time, and supplies the current error $\Delta I$ having undergone the integral calculation to an I-gain control section BL5 (i.e., integral-term-gain control section BL5).

Figure 4A:
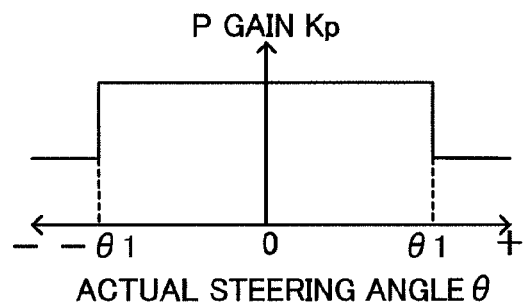
FIG. 4A is a graph showing an example relation between steering angle and P gain.
Figure 4B:
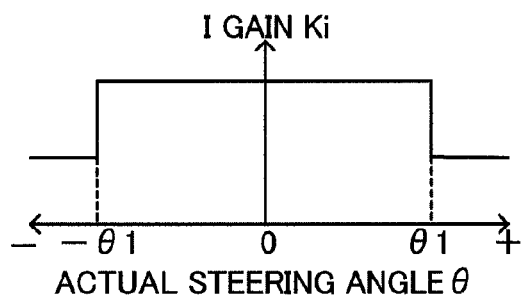
FIG. 4B is a graph showing an example relation between steering angle and I gain.

Meanwhile, a PI-gain setting section BL6 (i.e., proportional/integral-control-gain setting section BL6) sets P gain Kp and I gain Ki, which change in accordance with the actual steering angle $\theta$, while referring to a P-gain table (i.e., proportional-term-gain table) and an I-gain table (integral-term-gain table) by making use of the actual steering angle $\theta$ detected by the steering angle sensor 22. These P-gain table and I-gain tables are previously provided in the ROM of the electronic control unit 24. As shown in FIGS. 4A and 4B, the P-gain table and I-gain table store the P gain Kp and the I gain Ki, each of which assumes a large value when the absolute value $|\theta|$ of the actual steering angle $\theta$ is equal to or smaller than a predetermined steering angle $\theta 1$ (e.g., 500 degrees), and assumes a small value when the absolute value $|\theta|$ is larger than the predetermined steering angle $\theta 1$, Notably, instead of utilizing these P-gain and I-gain tables, the P gain Kp and the I gain Ki may be calculated by use of previously prepared functions which respectively represent the P gain Kp and the I gain Ki, which change in accordance with the actual steering angle $\theta$.

The P-gain control section BL4 outputs to an adding section BL7 a proportional control value $Kp \cdot \Delta I$, which is obtained by multiplying the current error $\Delta I$ supplied from the current error calculation section BL2 by the P gain Kp supplied from the PI-gain setting section BL6. The I-gain control section BL5 outputs to the adding section BL7 an integral control value $Ki \cdot \int \Delta I dt$, which is obtained by multiplying the current error integral value $\int \Delta dt$ supplied from the integral calculation section BL3 by the I gain Ki supplied from the PI-gain setting section BL6. The adding section BL7 adds the proportional control value $Kp \cdot \Delta I$ and the integral control value $Ki \cdot \int \Delta I dt$ together, and outputs the resultant value $Kp \cdot \Delta I + Ki \cdot \int \Delta I dt$ to the drive circuit 25 as the control voltage value $E_O$.

The drive circuit 25 supplies to the electric motor 15 a drive current proportional to the control voltage value $E_O$, and feedback-controls the rotation of the electric motor 15. Accordingly, the electric motor 15 rotates and outputs a rotational torque proportional to the control voltage value $E_O$. The rotation of the electric motor 15 is transmitted to the ball-screw mechanism 16, which converts rotational motion of the electric motor 15 to rectilinear motion, while reducing the rotational speed, and drives the rack bar 14 in the axial direction. As a result, driver's operation of rotating the steering wheel 11 is assisted by means of the electric motor 15, so that the left and right front wheels FW1 and FW2 are steered by a steering force applied by the driver and an assist force generated by the electric motor 15.

Accordingly, the driver can rotate the steering wheel 11 while being assisted by the assist force generated by the electric motor 15. In this case, even when the actual steering angle $\theta$ becomes large, the electric motor 15 is driven and controlled in accordance with the target current value I*, and a control quantity for the electric motor 15 required in a state where the actual steering angle $\theta$ is large is secured, so that steering feel does not deteriorate. Further, when the absolute value $|\theta|$ of the actual steering angle $\theta$ is equal to or smaller than the predetermined steering angle $\theta 1$, the P gain Kp and the I gain Ki are set to respective large values. As a result of use of the P gain Kp and the I gain Ki set to large values, in this first control example, the control responsiveness of the electric motor 15 is maintained high so long as the absolute value $|\theta|$ of the actual steering angle $\theta$ is within the predetermined steering angle $\theta 1$, thereby suppressing generation of abnormal noise from the steering mechanism consisting of the electric motor 15, the ball-screw mechanism 16, the rack bar 14, etc. When the absolute value $|\theta|$ of the actual steering angle $\theta$ increases and exceeds the predetermined steering angle $\theta 1$, the gains Kp and Ki, which are feedback gains, are changed to smaller values. As a result of feedback control of the electric motor 15 with the smaller gains Kp and Ki, even when variation of the control voltage value $E_O$ increases, the output torque of the electric motor 15 becomes difficult to change, so that generation of abnormal noise stemming from overcompensation of the steering mechanism is suppressed.

Figure 5A:
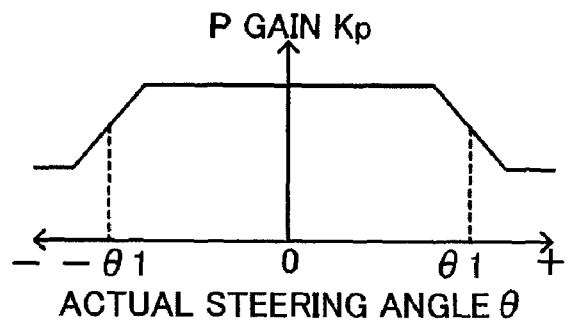
FIG. 5A is a graph showing another example relation between steering angle and P gain.
Figure 5B:
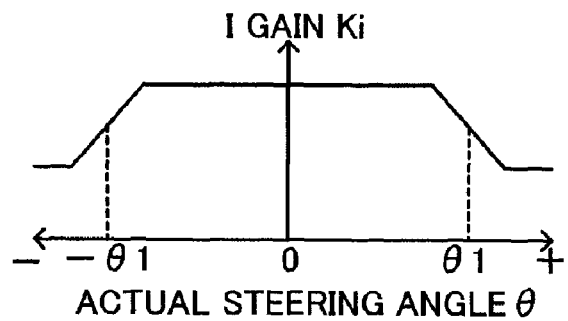
FIG. 5B is a graph showing another example relation between steering angle and I gain.

Notably, in the first control example, there are used the P-gain and I-gain tables which respectively store the P gain Kp and the I gain Ki, each of which changes from a first value to a second value when the absolute value $|\theta|$ of the actual steering angle $\theta$ exceeds the predetermined steering angle $\theta 1$. However, in place of these tables, there can be used P-gain and I-gain tables which respectively store a P gain Kp and an I gain Ki, each of which gradually changes from a large value to a small value as the absolute value $|\theta|$ of the actual steering angle $\theta$ increases while passing through the predetermined steering angle $\theta 1$, as shown in FIGS. 5A and 5B. In this case, feedback control is performed by use of the P gain Kp and the I gain Ki, which smoothly change in accordance with a change in the actual steering angle $\theta$, so that switching of the feedback gain is effected smoothly. Accordingly, as compared with the case of the above-described first control example, the driver feels a smaller degree of unnatural sensation when he rotates the steering wheel 11.

Figure 6A:
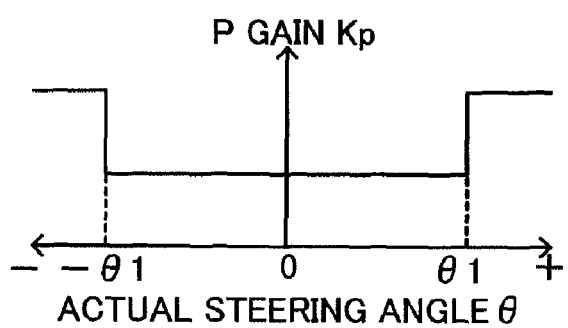
FIG. 6A is a graph showing still another example relation between steering angle and P gain.
Figure 6B:
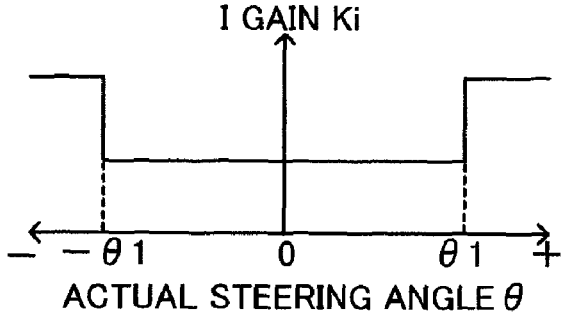
FIG. 6B is a graph showing still another example relation between steering angle and I gain.
Figure 7A:
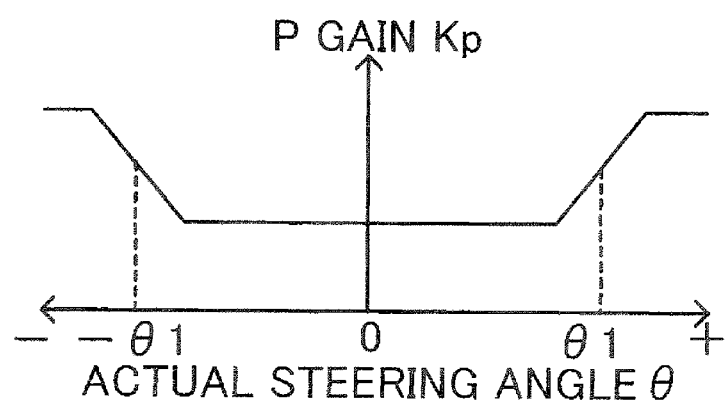
FIG. 7A is a graph showing still another example relation between steering angle and P gain.
Figure 7B:
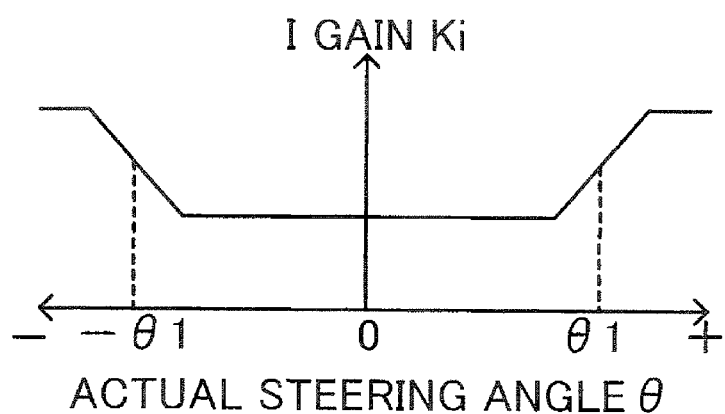
FIG. 7B is a graph showing still another example relation between steering angle and I gain.

In the first control example and its modification, when the absolute value $|\theta|$ of the actual steering angle $\theta$ increases, the P gain Kp and the I gain Ki are decreased to values smaller than those at the time when the absolute value $|\theta|$ is small. However, there can be used P-gain and I-gain tables which respectively store a P gain Kp and an I gain Ki, each of which assumes a small value when the absolute value $|\theta|$ of the actual steering angle $\theta$ is equal to or less than the predetermined steering angle $\theta 1$ and assumes a large value when the absolute value $|\theta|$ exceeds the predetermined steering angle $\theta 1$ as shown in FIGS. 6A and 6B. In this modification as well, there can be used P-gain and I-gain tables which respectively store a P gain Kp and an I gain Ki, each of which gradually changes from a small value to a large value as the absolute value $|\theta|$ of the actual steering angle $\theta$ increases while passing through the predetermined steering angle $\theta 1$, as shown in FIGS. 7A and 7B.

As in the case of the first control example, the control for the electric motor 15 may be tuned such that no abnormal noise is generated from the steering mechanism, composed of the electric motor 15, the ball-screw mechanism 16, and the rack bar 14, in a state where the control responsiveness (i.e., frequency responsiveness) of the electric motor 15 is high and the absolute value |θ| of the actual steering angle θ is not large. However, in some steering assist apparatuses, the control for the electric motor 15 is tuned in accordance with the characteristics of the steering mechanism such that no abnormal noise is generated from the steering mechanism, by means of lowering the control responsiveness (i.e., frequency responsiveness) of the electric motor 15 within a range in which the absolute value |θ| of the actual steering angle θ is not large. In such a case, when the absolute value |θ| of the actual steering angle θ increases, a response delay of the output torque of the electric motor 15 in relation to the operation of the steering mechanism tends to be remarkable. However, in the above-described modification, when the absolute value |θ| of the actual steering angle θ is large, both the P gain Kp and the I gain Ki increase in a manner contrary to the case of the first control example. Therefore, the response delay of the output torque of the electric motor 15 is mitigated, and generation of abnormal noise from the steering mechanism is suppressed.

In the first control example and its modification, the electric motor 15 is feedback-controlled by making use of both the P gain Kp and the I gain Ki. However, the electric motor 15 may be feedback-controlled by making use of only one of the P gain Kp and the I gain Ki. Although in control examples to be described later the electric motor 15 is feedback-controlled by making use of both the P gain Kp and the I gain Ki, the electric motor 15 may be feedback-controlled by making use of only one of the P gain Kp and the I gain Ki in the other control examples as well.

b. Second Control Example

Figure 8:
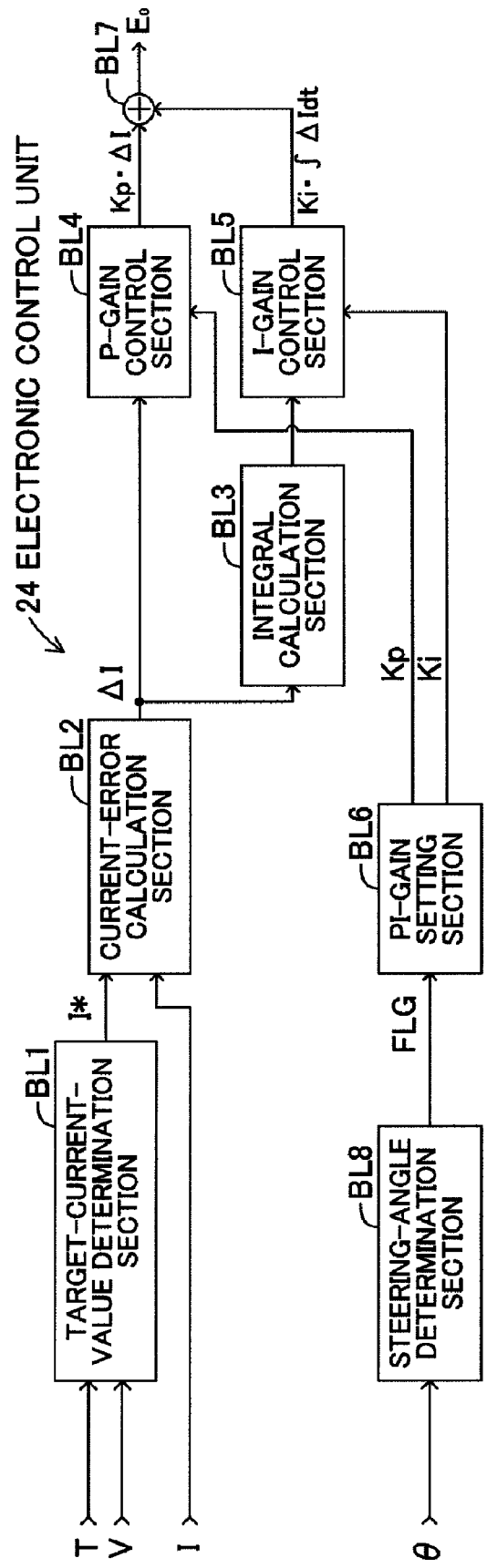
FIG. 8 relates a second control example of the present invention and shows a functional block diagram of the electronic control unit of FIG. 1

Next, a second control example will be described. FIG. 8 shows a functional block diagram of the electronic control unit 24 according to this second control example. The block diagram of FIG. 8 differs from that of FIG. 2 in that a steering-angle determination section BL8 is added to a stage preceding to the P-gain setting section BL6. Although the PI-gain setting section BL6 of FIG. 8 differs in function from the P-gain setting section BL6 of FIG. 2, the remaining sections are identical with those of the functional block diagram of FIG. 2. Therefore, only portions different from the first control example will be described, and descriptions of the remaining portions will not be repeated.

The steering-angle determination section BL8 repeatedly executes, at predetermined short intervals, a steering-angle determination program of FIG. 9, which is composed of steps S10 to S15, so as to set a flag FLG to "0" or "1." The flag FLG is used to determine conditions for setting the P gain and the I gain. That is, the steering-angle determination section BL8 acquires the actual steering angle θ from the steering angle sensor 22, and sets the flag FLG to "0" when the absolute value |θ| of the actual steering angle θ is equal to or less than the predetermined steering angle θ1 and to "1" when the absolute value |θ| exceeds the predetermined steering angle θ1.

The PI-gain setting section BL6 repeatedly executes, at predetermined short intervals, a PI-gain setting program of FIG. 10, which is composed of steps S20 to S24, so as to set the P gain Kp and the I gain Ki in accordance with the value of the flag FLG set by the steering-angle determination section BL8, with reference to a P-gain map and an I-gain map, respectively. That is, the P-gain map and the I-gain map are shown in FIG. 11, and when the value of the flag FLG is "0," the P gain Kp and the I gain Ki are set to ordinary constants Kp1 and Ki1, respectively. When the value of the flag FLG is "1," the P gain Kp and the I gain Ki are set to abnormal-noise coping constants Kp2 and Ki2, respectively.

In the case where the control for the electric motor 15 is tuned such that no abnormal noise is generated from the steering mechanism (composed of the electric motor 15, the ball-screw mechanism 16, and the rack bar 14) in a state where the control responsiveness of the electric motor 15 is high and the absolute value |θ| of the actual steering angle θ is not large, the P-gain map and the I-gain map are prepared such that the noise coping constants Kp2 and Ki2 assume smaller values than do the ordinary constants Kp1 and Ki1, as in the case of the gain tables of FIGS. 4A and 4B. Meanwhile, in the case where the control for the electric motor 15 is tuned such that no abnormal noise is generated from the steering mechanism in a state where the control responsiveness of the electric motor 15 is low and the absolute value |θ| of the actual steering angle θ is not large, the P-gain map and the I-gain map are prepared such that the noise coping constants Kp2 and Ki2 assume larger values than do the ordinary constants Kp1 and Ki1, as in the gain tables of FIGS. 6A and 6B. Notably, in the control examples to be described later, these constants Kp1, Ki1, Kp2, and Ki2 are also used, and set in the above-described manner.

As described above, in the second control example as well, when the absolute value |θ| of the actual steering angle θ increases, the P gain Kp and the I gain Ki are switched from the ordinary constants Kp1 and Ki1 to the noise coping constants Kp2 and Ki2 as in the case of the above-described first control example. Therefore, in the second control example as well, like the case of the first control example, good steering feel is always maintained even when the actual steering angle θ changes, and the generation of abnormal noise from the steering mechanism, composed of the ball-screw mechanism 16 and the rack bar 14, is always suppressed even when the actual steering angle θ changes.

c. Third Control Example

Figure 12:
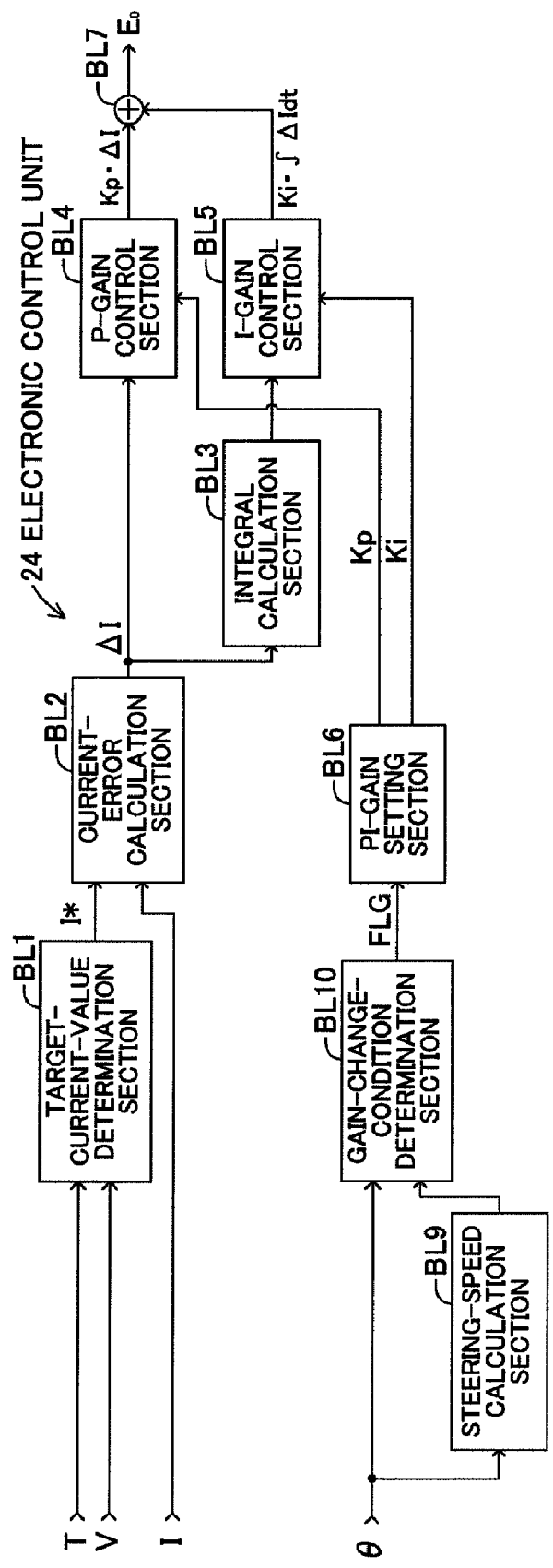
FIG. 12 relates a third control example of the present invention and shows a functional block diagram of the electronic control unit of FIG. 1.

Next, a third control example will be described. FIG. 12 shows a functional block diagram of the electronic control unit 24 according to this third control example. The block diagram of FIG. 12 differs from that of FIG. 8 relating to the second embodiment in that the steering-angle determination section BL8 is replaced with a steering-speed calculation section BL9 and a gain-change-condition determination section BL10. Since the remaining portions, including the PI-gain setting section BL6, are identical with those of FIG. 8, only portions different from the second control example will be described, and descriptions of the remaining portions will not be repeated.

The steering-speed calculation section BL9 differentiates, with respect to time, the actual steering angle θ acquired from the steering angle sensor 22 and calculates steering speed ω of the steering wheel 11 (equivalent to the steering speed of the left and right front wheels FW1 and FW2 and the rotational speed of the electric motor 15). The gain-change-condition determination section BL10 repeatedly executes, at predetermined short intervals, a gain-change-condition determination program of FIG. 13, which is composed of steps S30 to S36, so as to set the flag FLG to "0" or "1" in accordance with the actual steering angle θ and the steering speed ω. That is, the gain-change-condition determination section BL10 acquires the actual steering angle θ from the steering angle sensor 22 and the calculated steering speed ω, and sets the flag FLG to "0" when the absolute value |θ| of the acquired actual steering angle θ is equal to or less than the predetermined steering angle θ1 or when the absolute value |ω| of the acquired steering speed ω is equal to or greater than a predetermined steering speed ω1 (e.g., 100 degrees/sec). The gain-change-condition determination section BL10 sets the flag FLG to "1" when the absolute value |θ| of the actual steering angle θ is greater than the predetermined steering angle θ1 and the absolute value |ω| of the steering speed ω is less than the predetermined steering speed ω1.

In the third control example, although the P gain Kp and the I gain Ki are switched according to the second control example, the P gain Kp and the I gain Ki are not switched from the ordinary constants Kp1 and Ki1 to the noise coping constants Kp2 and Ki2 even when the absolute value |θ| of the actual steering angle θ is greater than the predetermined steering angle θ1, unless the absolute value |ω| of the steering speed ω is less than the predetermined steering speed ω1. As a result, even when the steering wheel 11 is further steered abruptly in a state where the steering wheel 11 has been steered to a large angle, the control responsiveness of the electric motor 15 is properly controlled, whereby generation of abnormal noise and occurrence of a failure in the steering mechanism can be prevented.

Specifically, in the case where the control for the electric motor 15 is tuned such that no abnormal noise is generated from the steering mechanism in a state where the control responsiveness of the electric motor 15 is high and the absolute value |θ| of the actual steering angle θ is not large, when the steering wheel 11 is steered at a high speed in a state where the absolute value |θ| is large, in some cases an abrupt voltage (current) change is required. In such a case, if the control responsiveness of the electric motor 15 is poor, abnormal noise may be generated from the steering mechanism and a failure may occur there. However, according to the third control example, in such a case, the P gain Kp and the I gain Ki are not switched from the ordinary constants Kp1 and Ki1 to the noise coping constants Kp2 and Ki2; i.e., the P gain Kp and the I gain Ki are not switched from high values to low values, so that the control responsiveness of the electric motor 15 is maintained at the previously set high level and generation of abnormal noise and occurrence of a failure in the steering mechanism are prevented.

Meanwhile, in the case where the control for the electric motor 15 is tuned such that no abnormal noise is generated from the steering mechanism in a state where the control responsiveness of the electric motor 15 is low and the absolute value |θ| of the actual steering angle θ is not large, when the steering wheel 11 is steered at a high speed in a state where the absolute value |θ| is large, in some cases an abrupt voltage (current) change is required. In such a case, if the control responsiveness of the electric motor 15 is increased sharply, abnormal noise may be generated due to difference in responsiveness between the electric motor 15 and the steering mechanism, and a system anomaly may occur. However, in such a case, the P gain Kp and the I gain Ki are not switched from the ordinary constants Kp1 and Ki1 to the noise coping constants Kp2 and Ki2; i.e., the P gain Kp and the I gain Ki are not switched from low values to high values, so that the control responsiveness of the electric motor 15 does not increase abruptly to an excessive degree, and generation of abnormal noise and occurrence of a failure in the steering mechanism are prevented.

Notably, the third control example may be modified in such a manner as to impart hysteresis to the control of changing the P gain Kp and the gain Ki in accordance with the actual steering angle θ and the acquired steering speed ω. In this modification, in place of the gain-change-condition determination program of FIG. 13, the gain-change-condition determination section BL10 repeatedly executes, at predetermined short intervals, a gain-change-condition determination program of FIG. 14.

Figure 15A:
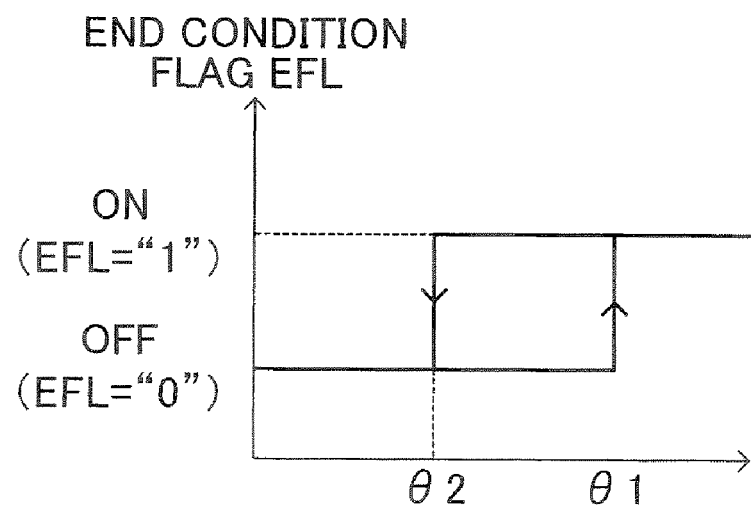
FIG. 15A is a graph showing a relation between steering angle and an end condition flag.

In this gain-change-condition determination program, after starting execution of the program in step S40, the gain-change-condition determination section BL10 acquires the actual steering angle θ and the steering speed ω in step S41. By means of the processing of steps S42 to S46, the gain-change-condition determination section BL10 sets an end condition flag EFL to "0" or "1" in accordance with a change in the actual steering angle θ. That is, as shown in FIG. 15A, in a state where the end condition flag EFL is set to "0," the gain-change-condition determination section BL10 changes the value of the flag EFL to "1" when the absolute value |θ| of the actual steering angle θ exceeds the predetermined steering angle θ1 (e.g., 500 degrees). Meanwhile, in a state where the end condition flag EFL is set to "1," the gain-change-condition determination section BL10 changes the value of the flag EFL to "0" when the absolute value |θ| of the actual steering angle θ becomes less than a predetermined steering angle θ2 (e.g., 490 degrees), which is smaller than the predetermined steering angle θ1.

Figure 15B:
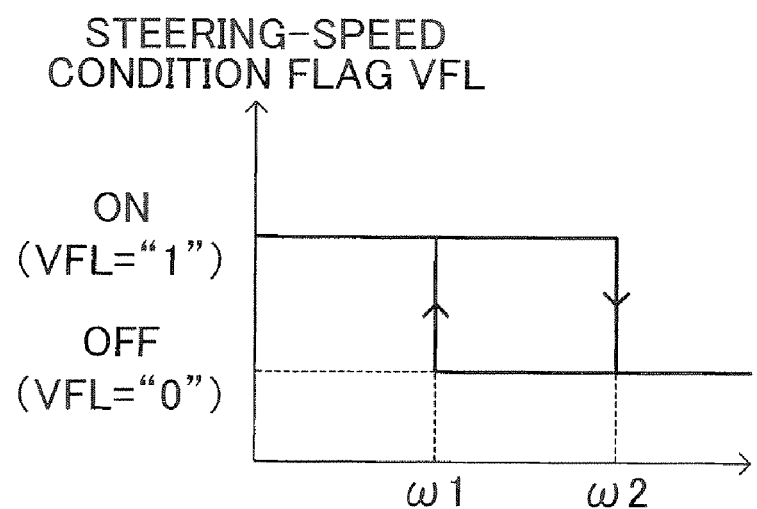
FIG. 15B is a graph showing a relation between steering speed and a steering speed condition flag.

Further, by means of the processing of steps S48 to S52, the gain-change-condition determination section BL10 sets a steering-speed condition flag VFL to "0" or "1" in accordance with a change in the steering speed ω. That is, as shown in FIG. 15B, in a state where the steering-speed condition flag VFL is set to "0," the gain-change-condition determination section BL10 changes the value of the steering-speed condition flag VFL to "1" when the absolute value |ω| of the acquired steering speed ω becomes less than the predetermined steering speed ω1 (e.g., 100 degrees/sec). Meanwhile, in a state where the steering-speed condition flag VFL is set to "1," the gain-change-condition determination section BL10 changes the value of the steering-speed condition flag VFL to "0" when the absolute value |ω| of the acquired steering speed ω becomes greater than a predetermined steering speed ω2 (e.g., 200 degrees/sec), which is greater than the predetermined steering speed ω1.

By means of the processing of steps S47, and S53 to S55, the gain-change-condition determination section BL10 sets the flag FLG to "0" when the end condition flag EFL is "0" or the steering-speed condition flag VFL is "0." Meanwhile, the gain-change-condition determination section BL10 sets the flag FLG to "1" when the end condition flag EFL is "1" and the steering-speed condition flag VFL is "1." The PI gain setting section BL6 changes the P gain Kp and the I gain Ki in accordance with this flag FLG as in the case of the third control example. As a result, hysteresis is imparted to the control of changing the P gain Kp and the I gain Ki in accordance with changes in the actual steering angle θ and steering speed ω.

According to this modification of the third control example, the frequency of switching the P gain Kp and the I gain Ki is reduced as compared with changes in the actual steering angle θ and the steering speed ω. As a result, frequent switching of the P gain Kp and the I gain Ki; i.e., frequent switching of the drive current supplied to the electric motor 15, is mitigated, and generation of abnormal noise in the steering mechanism is suppressed more effectively.

d. Fourth Control Example

Figure 16:
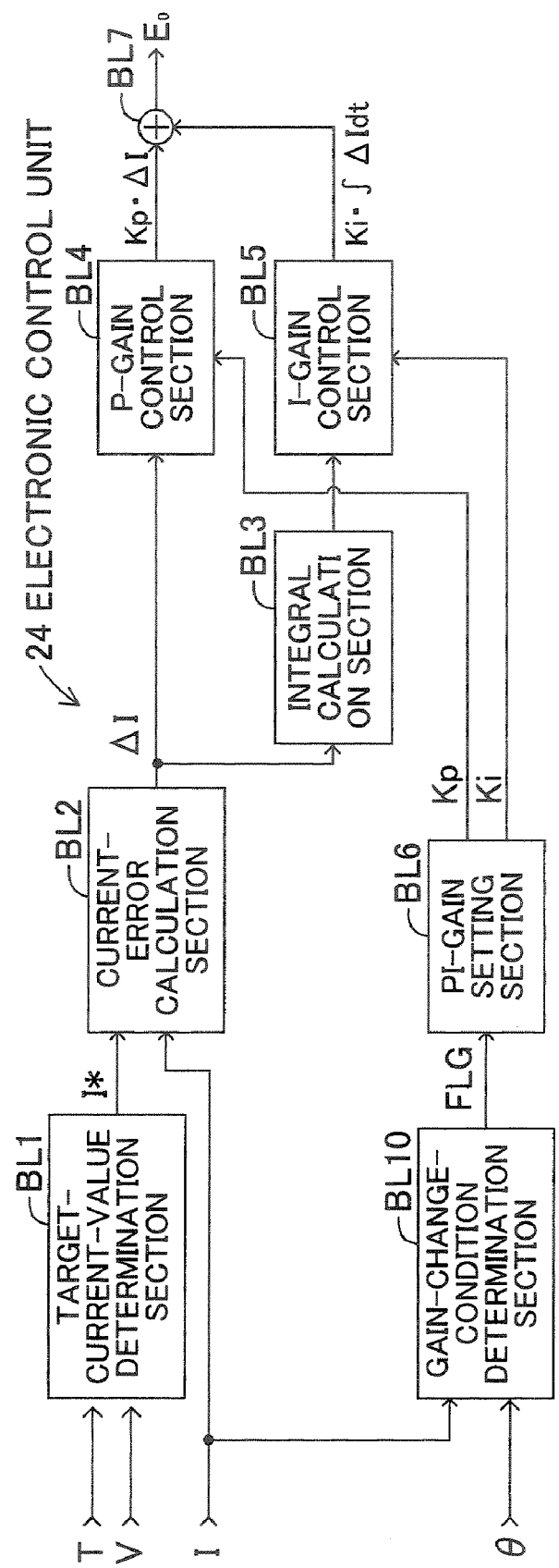
FIG. 16 relates a fourth control example of the present invention and shows a functional block diagram of the electronic control unit of FIG. 1.

Next, a fourth control example will be described. FIG. 16 shows a functional block diagram of the electronic control unit 24 according to this fourth control example. The block diagram of FIG. 16 differs from that of FIG. 12 relating to the third control example in that the steering-speed calculation section BL9 is omitted, and in place of the steering speed ω, the actual current value I, which represents current flowing through the electric motor 15 and detected by the current sensor 25a, is input to the gain-change-condition determination section BL10. Since the remaining portions are identical to those of FIG. 12, only portions different from the third control example will be described, and descriptions of the remaining portions will not be repeated.

Figure 13:
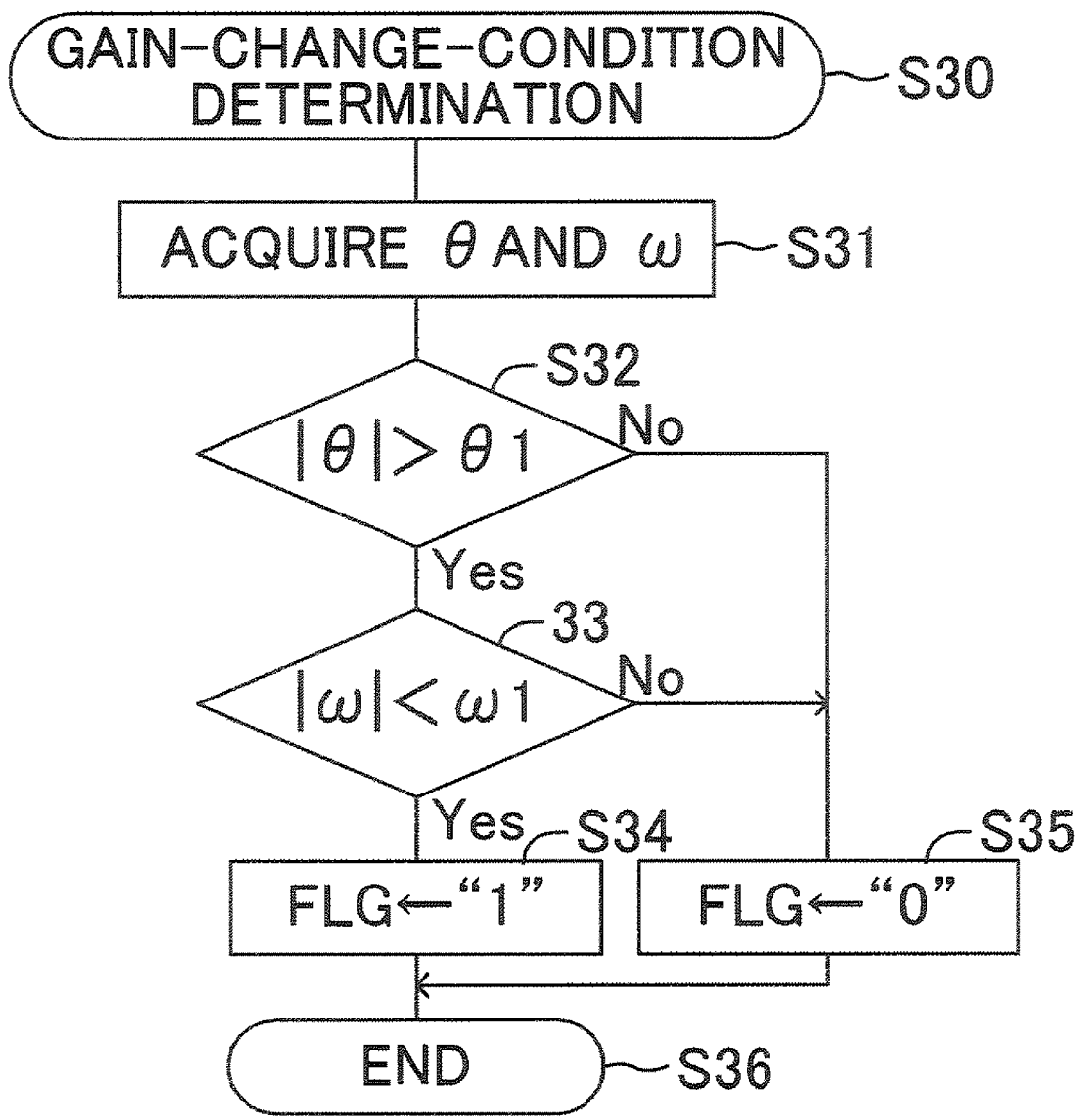
FIG. 13 is a flowchart showing a gain-change-condition determination program executed in a gain-change-condition determination section of FIG. 12.
Figure 17:
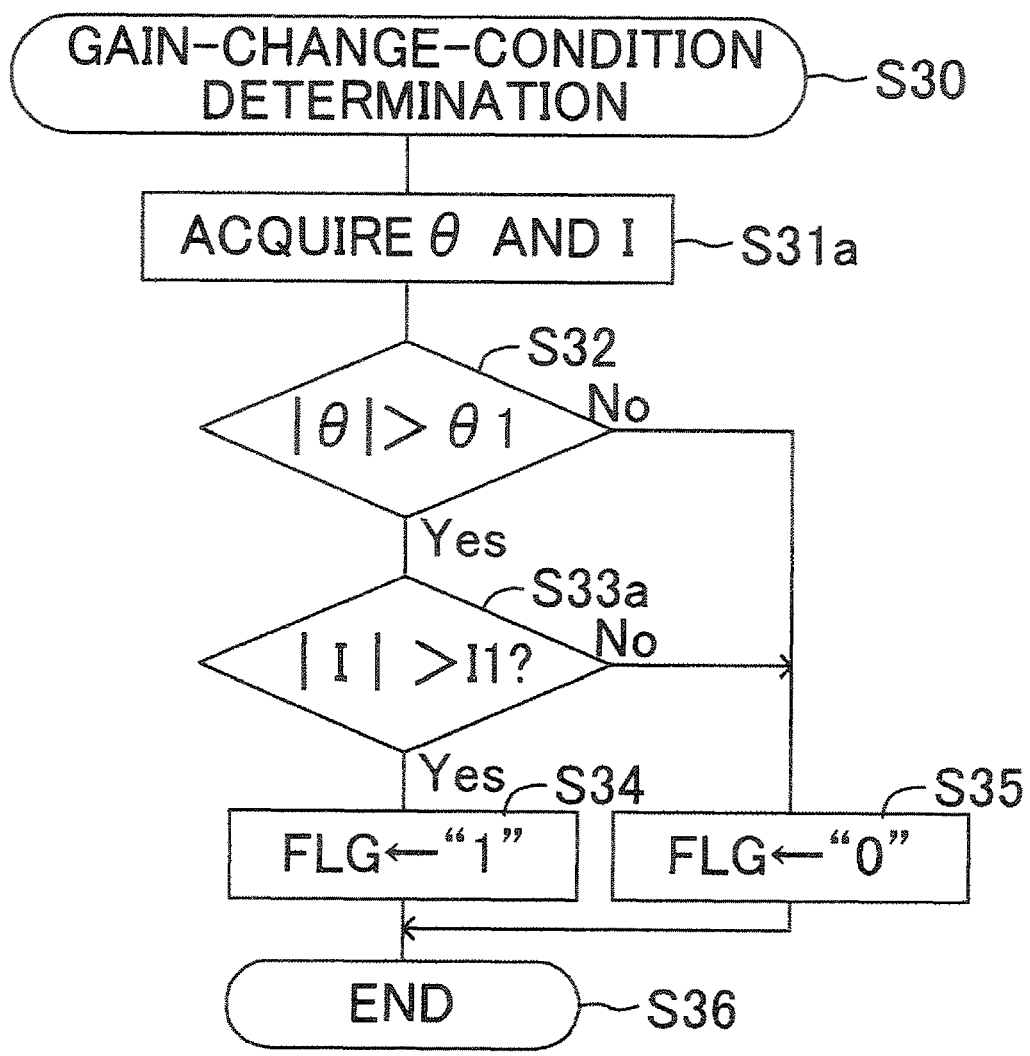
FIG. 17 is a flowchart showing a gain-change-condition determination program executed in a gain-change-condition determination section of FIG. 16.

The gain-change-condition determination section BL10 repeatedly executes, at predetermined short intervals, a gain-change-condition determination program of FIG. 17, which is composed of steps S30 to S36, similar to those of FIG. 13 but steps S31 and S33 being replaced with steps S31a and S33a. In step S31a, the gain-change-condition determination section BL10 acquires the actual current value I from the current sensor 25a rather than the steering speed used in the third control example. In step S33a, the gain-change-condition determination section BL10 determines whether or not the absolute value |I| of the actual current value I is greater than a predetermined current value I1 (e.g., 30 A). Notably, this predetermined current value I1 corresponds to a current which flows through the electric motor 15 when the steering wheel 11 is steered to a steering angle of about ±500 degrees in a state where the vehicle speed V is about 10 km/h (when switching of the P gain Kp and the I gain Ki is performed).

Through execution of the gain-change-condition determination program of FIG. 17, the gain-change-condition determination section BL10 sets the flag FLG to "0" when the absolute value |θ| of the actual steering angle θ is equal to or less than the predetermined steering angle θ1 or when the absolute value |I| of the actual current value I is equal to or less than the predetermined current value I1. Further, the gain-change-condition determination section BL10 sets the flag FLG to "1" when the absolute value |θ| of the actual steering angle θ is greater than the predetermined steering angle θ1 and the absolute value |I| of the actual current value I is greater than the predetermined current value I1.

In such a fourth control example, although the P gain Kp and the I gain Ki are switched according to the second control example, the P gain Kp and the I gain Ki are not switched from the ordinary constants Kp1 and Ki1 to the noise coping constants Kp2 and Ki2 even when the absolute value |θ| of the actual steering angle θ is greater than the predetermined steering angle θ1, unless the absolute value |I| of the actual current value I becomes greater than the predetermined current value I1. In other words, even when the absolute value |θ| of the actual steering angle θ becomes approximately equal to the predetermined steering angle θ1, if the vehicle speed V is high, the P gain Kp and the I gain Ki are not switched from the ordinary constants Kp1 and Ki1 to the noise coping constants Kp2 and Ki2, because the absolute value |I| of the actual current value I does not increases (see FIG. 3). As a result, even when the ordinary constants Kp1 and Ki1 and the noise coping constants Kp2 and Ki2 are set in such a manner as to prevent generation of abnormal noise from the steering mechanism during periods in which the vehicle stops or travels at very low speed and the steering wheel 11 is steered to a great extent, the P gain Kp and the I gain Ki are not switched from the ordinary constants Kp1 and Ki1 to the noise coping constants Kp2 and Ki2 during periods in which the vehicle travels at high speed whereby deterioration of steering feel can be prevented.

Notably, the fourth control example may be modified in such a manner as to impart hysteresis to the control of changing the P gain Kp and the I gain Ki in accordance with the actual steering angle θ and the actual current value I. In this modification, in place of the gain-change-condition determination program of FIG. 17, the gain-change-condition determination section BL10 repeatedly executes, at predetermined short intervals, a program modified from the gain-change-condition determination program of FIG. 14.

Figure 14:
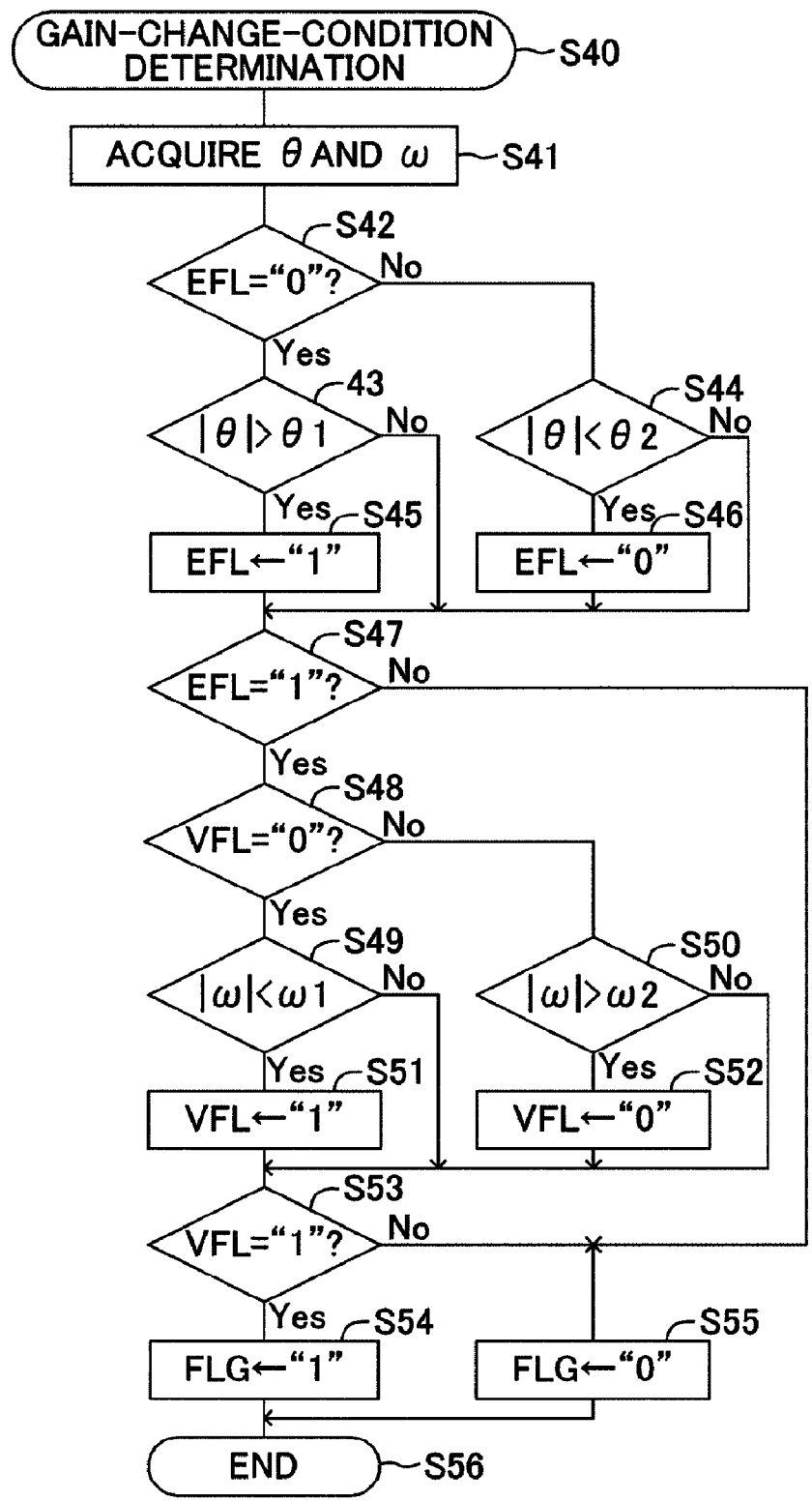
FIG. 14 is a flowchart showing a modification of the gain-change-condition determination program of FIG. 12.

In the program modified from the gain-change-condition determination program of FIG. 14, the gain-change-condition determination section BL10 acquires the actual current value I instead of the steering speed ω in step S41, and performs the determination processing of step S33a of FIG. 17 rather than the determination processing of step S49. Further, instead of performing the determination processing of step S50, the gain-change-condition determination section BL10 determines whether or not the absolute value |I| of the actual current value I is less than a predetermined current value I2, which is smaller than the predetermined current value I1. When the absolute value |I| of the actual current value I is less than the predetermined current value I2, the gain-change-condition determination section BL10 proceeds to step S52. When the absolute value |I| of the actual current value I is equal to or greater than the predetermined current value I2, the gain-change-condition determination section BL10 proceeds to step S53. Notably, in this case, the above-described steering-speed condition flag VFL is to be read as a current condition flag VFL.

As a result, according to this modification of the fourth control example as well, the frequency of switching the P gain Kp and the I gain Ki is reduced as compared with changes in the actual steering angle θ and the actual current value I. Therefore, frequent switching of the P gain Kp and the I gain Ki; i.e., frequent switching of the drive current supplied to the electric motor 15, is mitigated, and generation of abnormal noise in the steering mechanism is suppressed more effectively.

In the fourth control example and its modification, the actual current value I is used for the control of switching the P gain Kp and the I gain Ki. However, in place of the actual current value I, which represents the current flowing through the electric motor 15, the target current value I* may be used, because the target current value I* is approximately equal to the actual current value I.

e. Fifth Control Example

Figure 18:
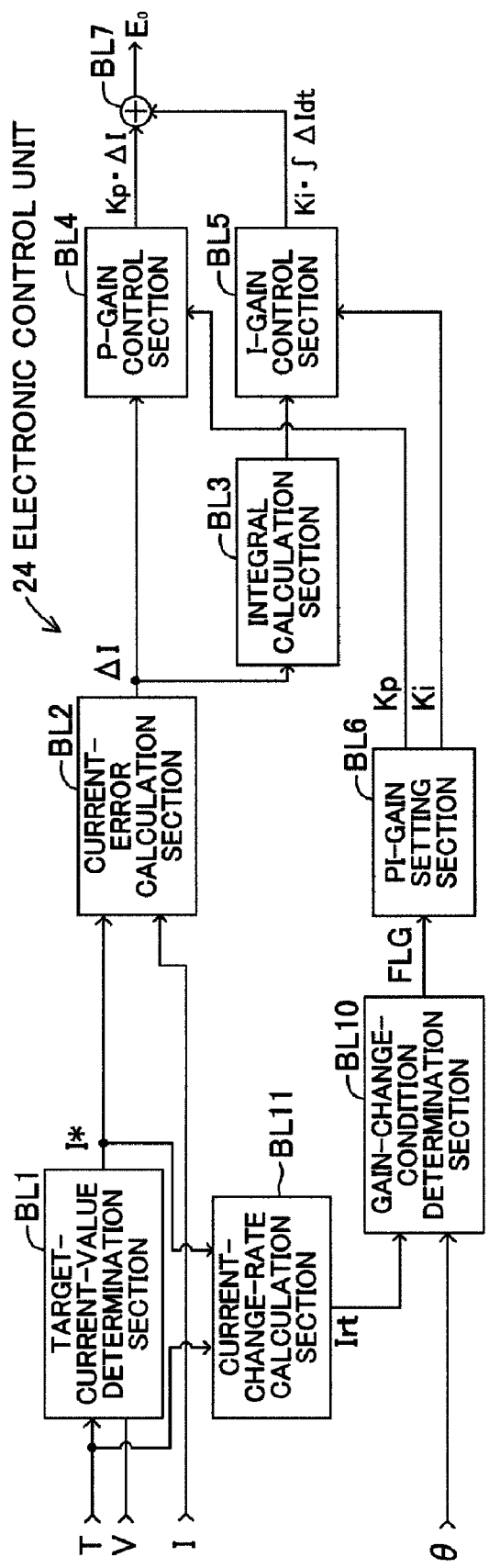
FIG. 18 relates a fifth control example of the present invention and shows a functional block diagram of the electronic control unit of FIG. 1

Next, a fifth control example will be described. FIG. 18 shows a functional block diagram of the electronic control unit 24 according to this fifth control example. The block diagram of FIG. 18 differs from that of FIG. 12 relating to the third control example in that a current-change-rate calculation section BL11 is used instead of the steering-speed calculation section BL9, and in place of the steering speed ω, a current change rate Irt calculated by the current-change-rate calculation section BL11 is input to the gain-change-condition determination section BL10. Since the remaining portions are identical with those of FIG. 12, only portions different from the third control example will be described, and descriptions of the remaining portions will not be repeated.

Figure 19:
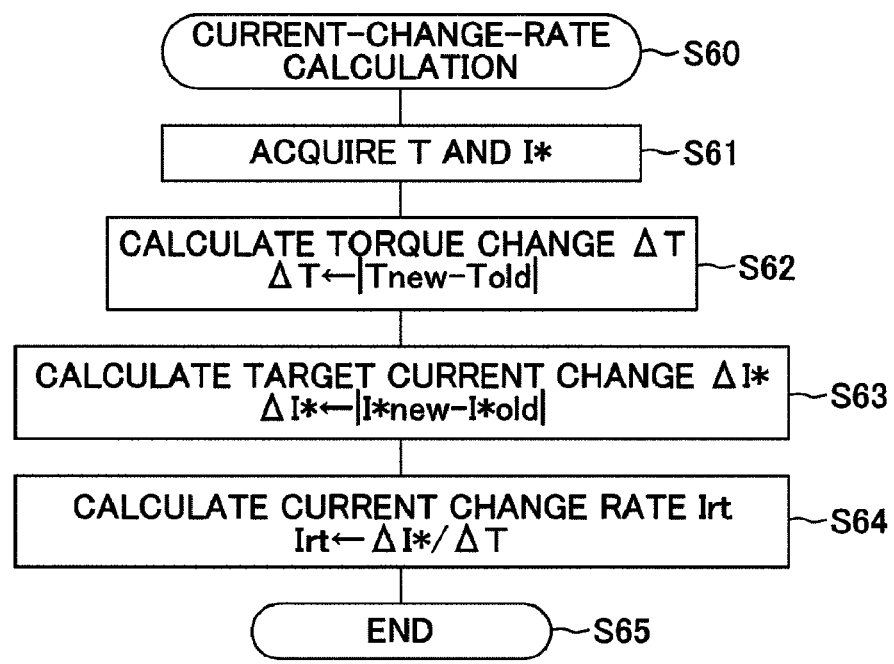
FIG. 19 is a flowchart showing a current-change-rate calculation program executed in a current-change-rate calculation section of FIG. 18.

The current-change-rate calculation section BL11 repeatedly executes, at predetermined short intervals, a current-change-rate calculation program of FIG. 19, which is composed of steps S60 to S65, so as to calculate, as a current change rate Irt, the ratio of change rate of the target current value I* to change rate of the steering torque T. Specifically, in step S61, the current-change-rate calculation section BL11 acquires the steering torque T detected by the steering torque sensor 21 and the target current value I* determined by the target-current-value determination section BL1. Next, in step S62, the current-change-rate calculation section BL11 subtracts steering torque Told at the time of the previous processing from steering torque Tnew at the time of the current processing, and calculates, as a torque change ΔT, the absolute value |Tnew−Told| of the subtraction result Tnew−Told. Next, in step S63, the current-change-rate calculation section BL11 subtracts target current value I*old at the time of the previous processing from target current value I*new at the time of the current processing, and calculates, as a target-current change ΔI*, the absolute value |I*new−I*old| of the subtraction result I*new−I*old. Subsequently, in step S64, the current-change-rate calculation section BL11 calculates the current change rate Irt by dividing the target-current change ΔI* by the torque change ΔT.

Figure 20:
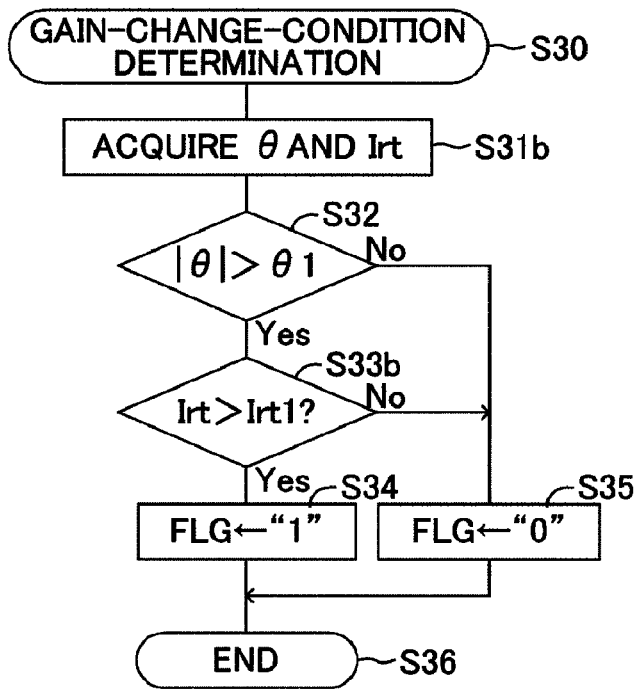
FIG. 20 is a flowchart showing a gain-change-condition determination program executed in a gain-change-condition determination section of FIG. 18.

The gain-change-condition determination section BL10 repeatedly executes, at predetermined short intervals, a gain-change-condition determination program of FIG. 20, which is composed of steps S30 to S36, similar to those of FIG. 13 but with steps S31 and S33 being replaced with steps S31b and S33b. In step S31b, the gain-change-condition determination section BL10 acquires the current change rate Irt calculated by the current-change-rate calculation section BL11 rather than the steering speed ω used in the third control example. In step S33b, the gain-change-condition determination section BL10 determines whether or not the current change rate Irt is greater than a predetermined current change rate Irt1 (e.g., 200 A/Nm).

Through execution of the gain-change-condition determination program of FIG. 20, the gain-change-condition determination section BL10 sets the flag FLG to "0" when the absolute value |θ| of the acquired actual steering angle θ is equal to or less than the predetermined steering angle θ1 or when the current change rate Irt is equal to or less than a predetermined current change rate Irt1. Further, the gain-change-condition determination section BL10 sets the flag FLG to "1" when the absolute value |θ| of the actual steering angle θ is greater than the predetermined steering angle θ1 and the current change rate Irt is greater than the predetermined current change rate Irt1.

In such a fifth control example, although the P gain Kp and the gain Ki are switched according to the second control example, the P gain Kp and the I gain Ki are not switched from the ordinary constants Kp1 and Ki1 to the noise coping constants Kp2 and Ki2 even when the absolute value |θ| of the actual steering angle θ is greater than the predetermined steering angle θ1, unless the current change rate Irt becomes greater than the predetermined current change rate Irt1. The current change rate Irt represents the magnitude of change in torque generated by the electric motor 15 for a required assist torque; i.e., a state where abnormal noise is likely to be generated, by an increase in its value. When the current change rate Irt is small, the switching of the P gain Kp and the I gain Ki from the ordinary constants Kp1 and Ki1 to the noise coping constants Kp2 and Ki2 is prohibited. When the current change rate Irt increases, the switching of the P gain Kp and the I gain Ki is permitted. As result, the P gain Kp and the I gain Ki become easy to be switched from the ordinary constants Kp1 and Ki1 to the noise coping constants Kp2 and Ki2 in a state where abnormal noise is likely to be generated, whereby reduction of abnormal noise and good steering feel are realized simultaneously.

Notably, the fifth control example may be modified in such a manner as to impart hysteresis to the control of changing the P gain Kp and the I gain Ki in accordance with the actual steering angle θ and the actual current value I. In this modification, in place of the gain-change-condition determination program of FIG. 20, the gain-change-condition determination section BL10 repeatedly executes, at predetermined short intervals, a program modified from the gain-change-condition determination program of FIG. 14.

In the program modified from the gain-change-condition determination program of FIG. 14, the gain-change-condition determination section BL10 acquires the current change rate Irt instead of the steering speed ω in step S41, and performs the determination processing of step S33b of FIG. 20 rather than the determination processing of step S49. Further, instead of performing the determination processing of step S50, the gain-change-condition determination section BL10 determines whether or not the current change rate Irt is less than a predetermined current change rate Irt2, which is smaller than the predetermined current change rate Irt1. When the current change rate Irt is less than the predetermined current change rate Irt2, the gain-change-condition determination section BL10 proceeds to step S52. When the current change rate Irt is equal to or greater than the predetermined current change rate Irt2, the gain-change-condition determination section BL10 proceeds to step S53. Notably, in this case, the above-described steering-speed condition flag VFL is to be read as a current-change-rate condition flag VFL.

As a result, in the modification of the fifth control example as well, the frequency of switching the P gain Kp and the I gain Ki for changes in the actual steering angle θ and the current change rate Irt is decreased. Accordingly, the frequent switching of the P gain Kp and the I gain Ki; i.e., the frequent switching of the drive current supplied to the electric motor 15, is mitigated, whereby generation of abnormal noise from the steering mechanism can be suppressed more effectively.

In the fifth control example and its modification, the target current value I* is used for the calculation of the current change rate Irt Instead of the target current value I*, which represents the current flowing through the electric motor 15, the actual current value I may be used, because the target current value I* is approximately equal to the actual current value I.

f. Sixth Control Example

Figure 21:
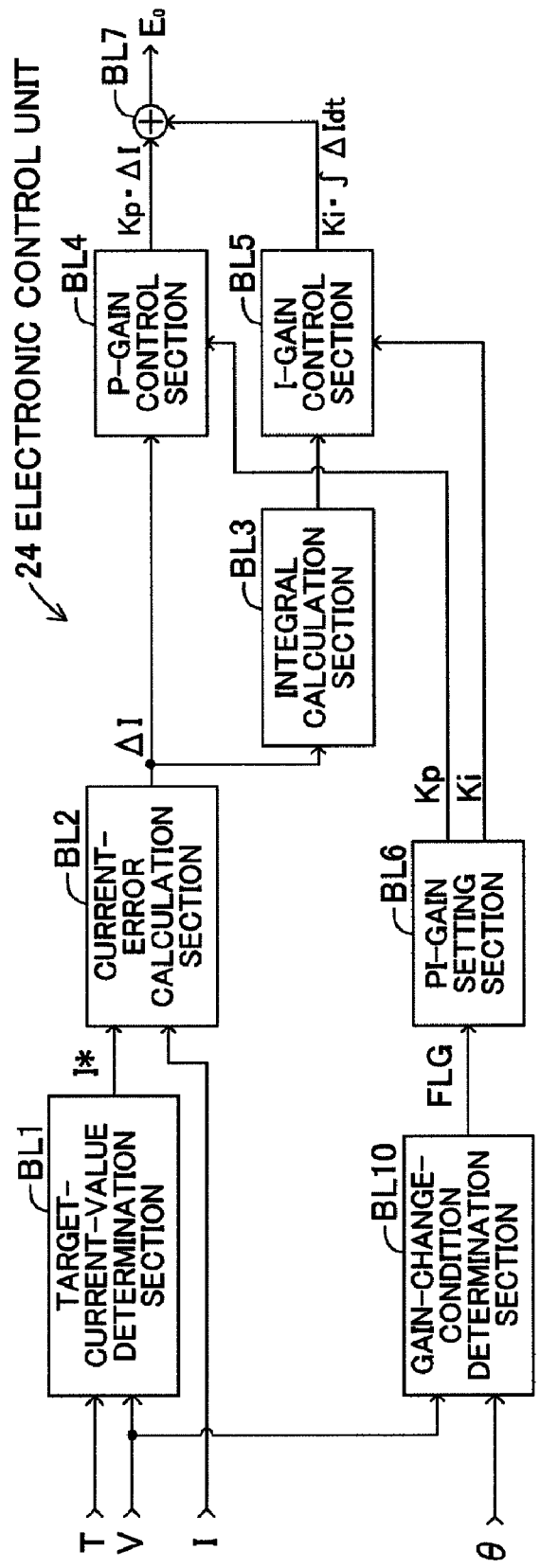
FIG. 21 relates a sixth control example of the present invention and shows a functional block diagram of the electronic control unit of FIG. 1

Next, a sixth control example will be described. FIG. 21 shows a functional block diagram of the electronic control unit 24 according to this sixth control example. The block diagram of FIG. 21 differs from that of FIG. 12 relating to the third control example in that the steering-speed calculation section BL9 is omitted, and in place of the steering speed ω, the vehicle speed V detected by the vehicle speed sensor 23 is input to the gain-change-condition determination section BL10. Since the remaining portions are identical with those of FIG. 12, only portions different from the third control example will be described, and descriptions of the remaining portions will not be repeated.

Figure 22:
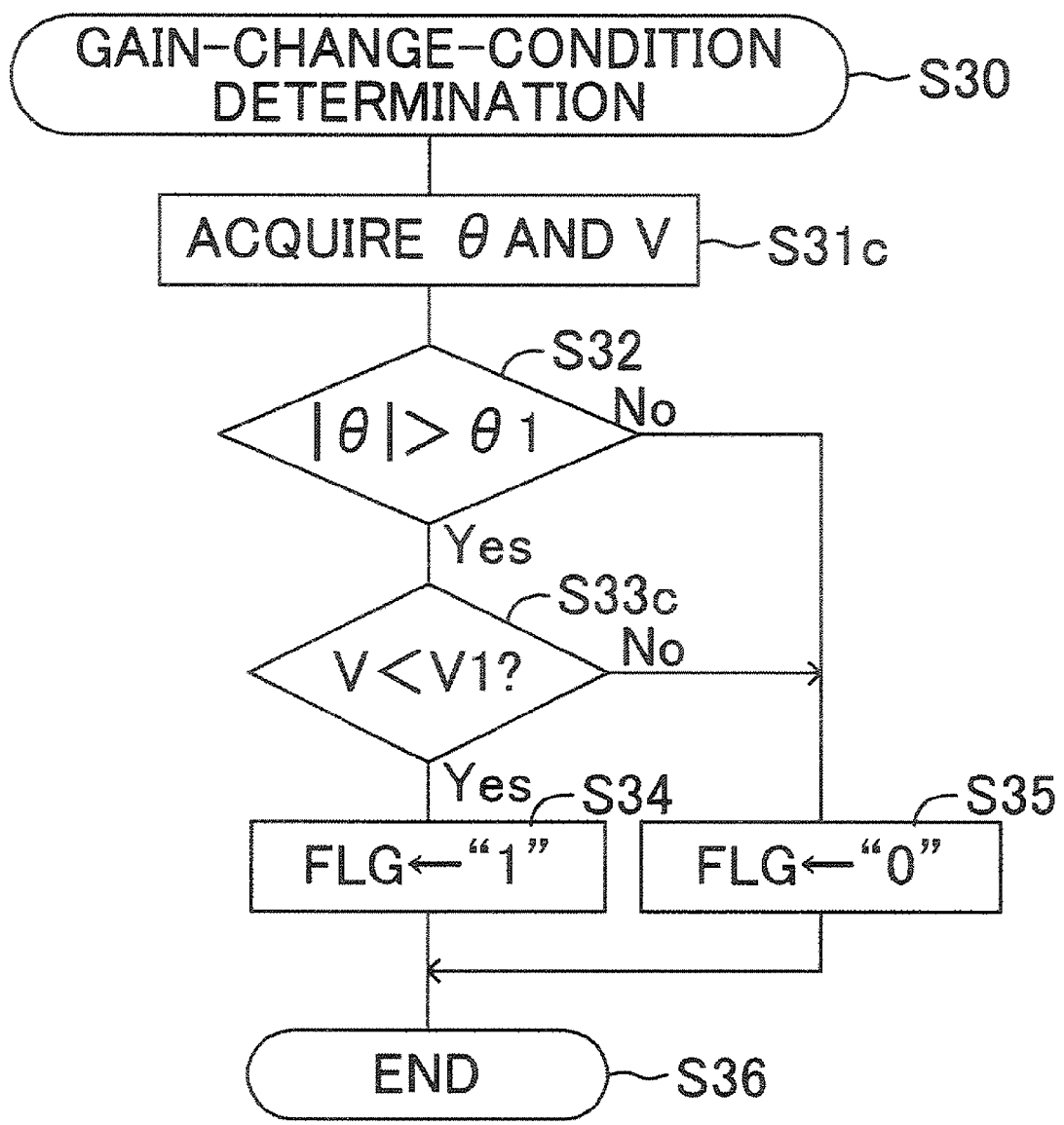
FIG. 22 is a flowchart showing a gain-change-condition determination program executed in a gain-change-condition determination section of FIG. 21.
Figure 23:
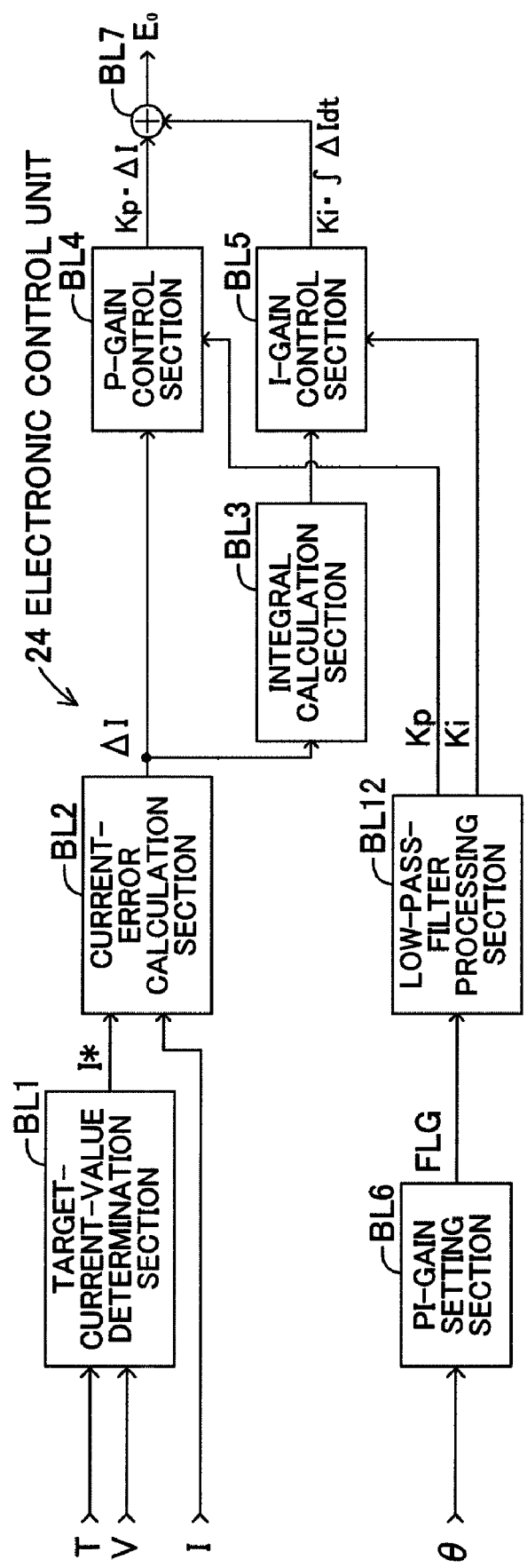
FIG. 23 relates a modification of the first control example and shows a functional block diagram of the electronic control unit of FIG. 1.
Figure 24:
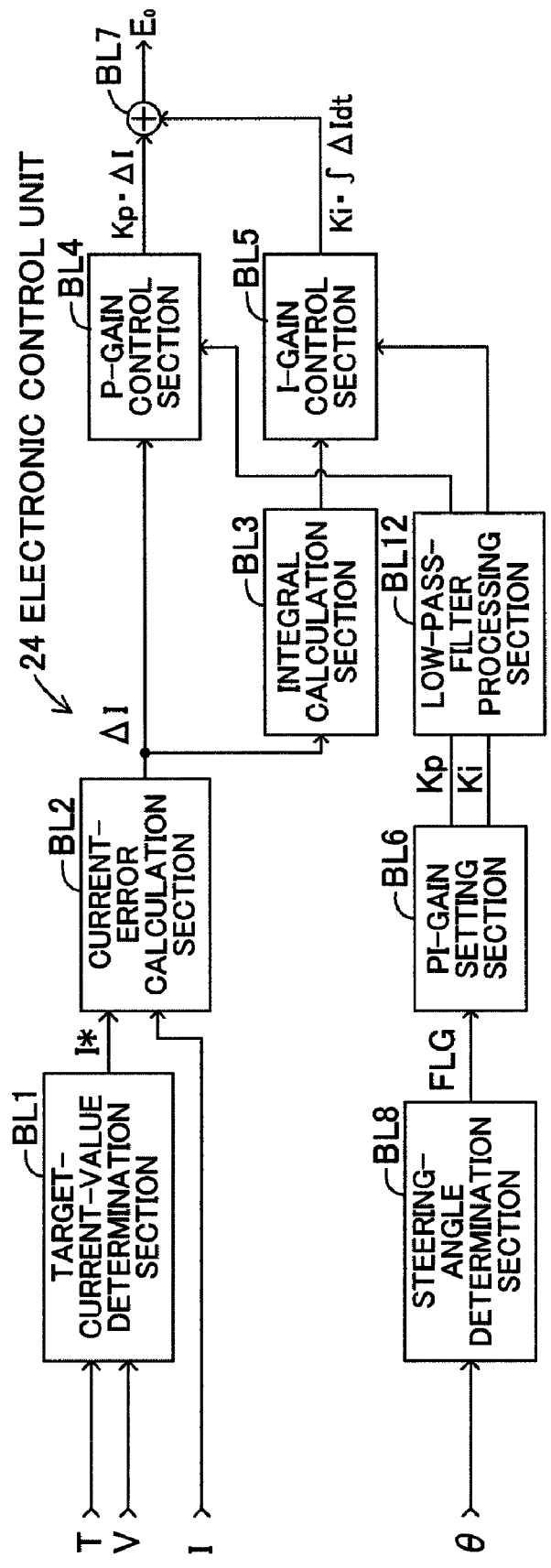
FIG. 24 relates a modification of the second control example and shows a functional block diagram of the electronic control unit of FIG. 1
Figure 25:
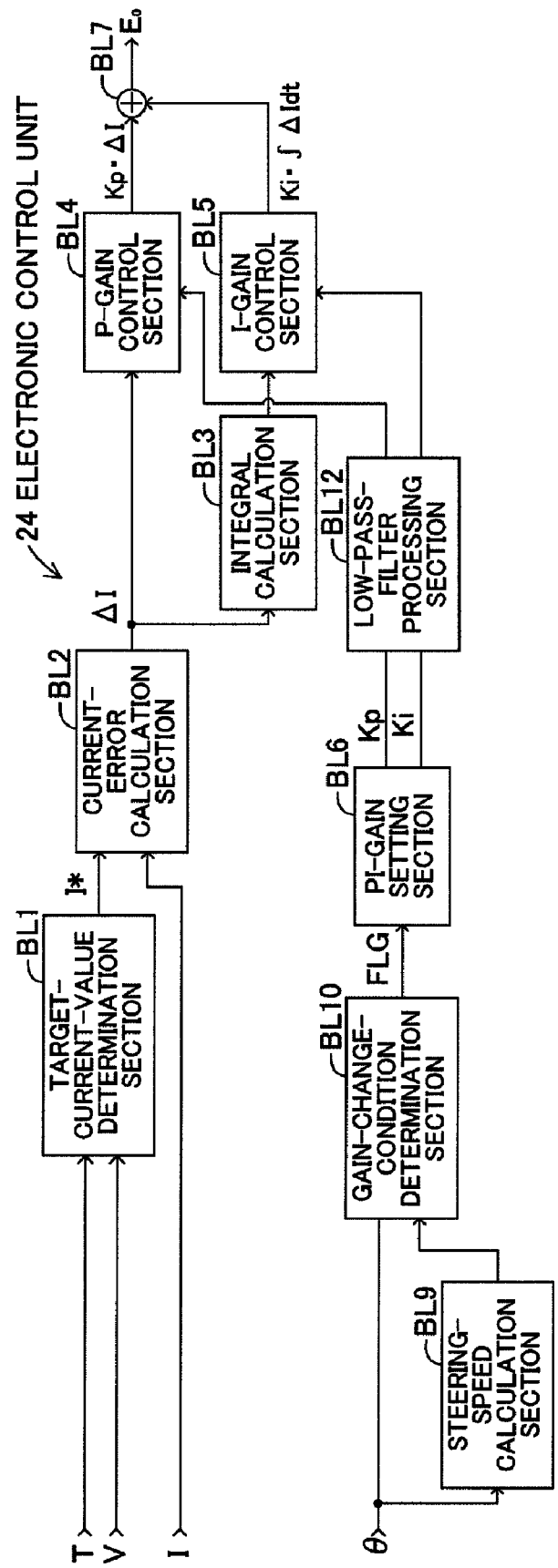
FIG. 25 relates a modification of the third control example and shows a functional block diagram of the electronic control unit of FIG. 1.
Figure 26:
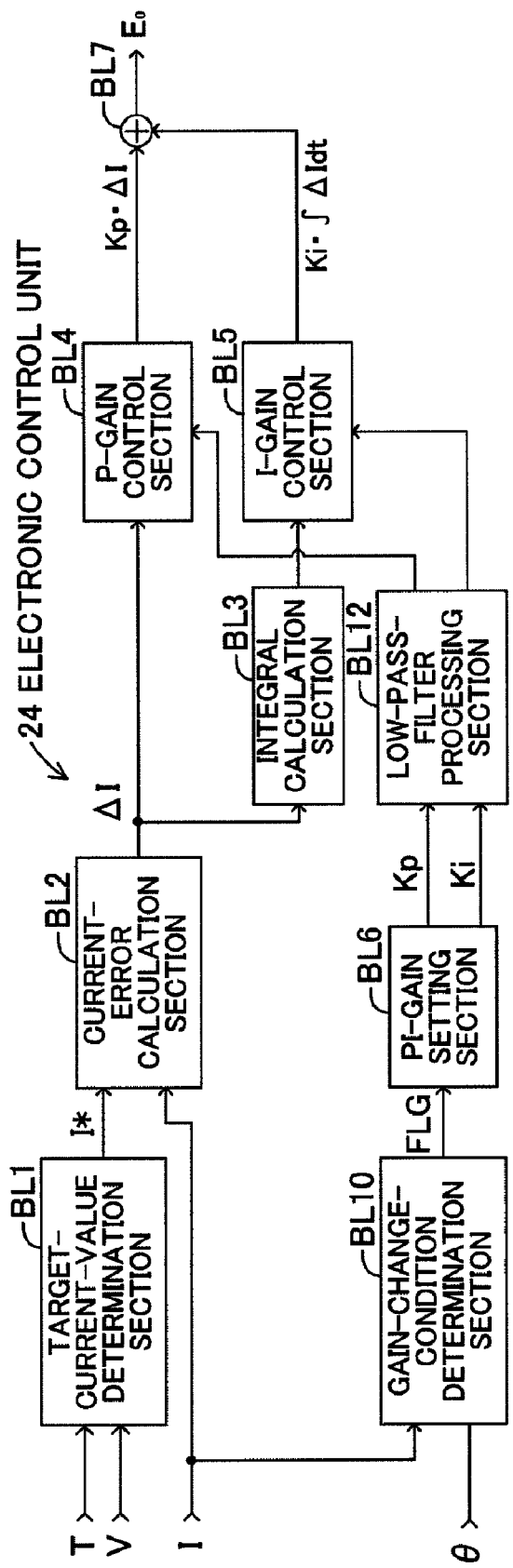
FIG. 26 relates a modification of the fourth control example and shows a functional block diagram of the electronic control unit of FIG. 1.
Figure 27:
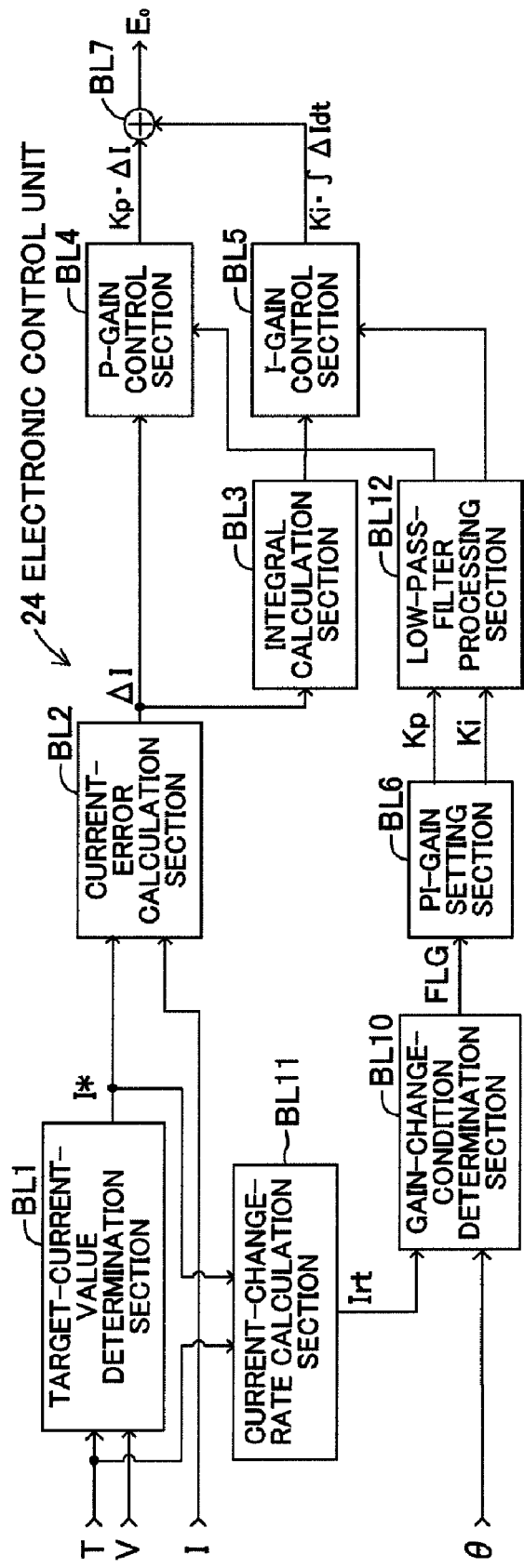
FIG. 27 relates a modification of the fifth control example and shows a functional block diagram of the electronic control unit of FIG. 1.
Figure 28:
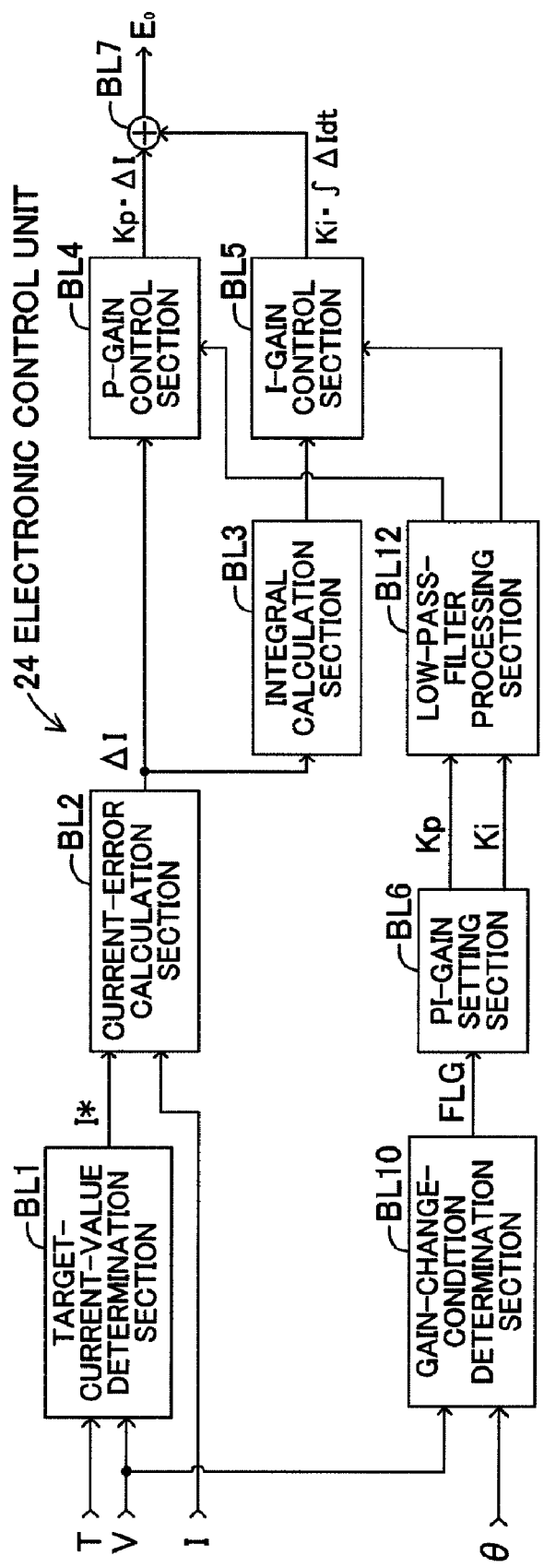
FIG. 28 relates a modification of the sixth control example and shows a functional block diagram of the electronic control unit of FIG. 1.

The gain-change-condition determination section BL10 repeatedly executes, at predetermined short intervals, a gain-change-condition determination program of FIG. 22, which is composed of steps S30 to S36, similar to those of FIG. 13 but with steps S31 and S33 being replaced with steps S31c and S33c. In step S31c, the gain-change-condition determination section BL10 acquires the vehicle speed V detected by the vehicle speed sensor 23 rather than the steering speed ω used in the third control example. In step S33c, the gain-change-condition determination section BL10 determines whether or not the vehicle speed V is less than a predetermined vehicle speed V1 (e.g., 10 km/h).

Through execution of the gain-change-condition determination program of FIG. 22, the gain-change-condition determination section BL10 sets the flag FLG to "0" when the absolute value |θ| of the acquired actual steering angle θ is equal to or less than the predetermined steering angle θ1 or when the vehicle speed V is equal to or greater than the predetermined vehicle speed V1. Further, the gain-change-condition determination section BL10 sets the flag FLG to "1" when the absolute value |θ| of the actual steering angle θ is greater than the predetermined steering angle θ1 and the vehicle speed V is less than the predetermined vehicle speed V1.

In such a sixth control example, although the P gain Kp and the I gain Ki are switched according to the second control example, the P gain Kp and the I gain Ki are not switched from the ordinary constants Kp1 and Ki1 to the noise coping constants Kp2 and Ki2 even when the absolute value |θ| of the actual steering angle θ is greater than the predetermined steering angle θ1, unless the vehicle speed V is equal to or less than the predetermined vehicle speed V1. As a result, even when the ordinary constants Kp1 and Ki1 and the noise coping constants Kp2 and Ki2 are set in such a manner as to prevent generation of abnormal noise from the steering mechanism during periods in which the vehicle stops or travels at very low speed and the steering wheel 11 is steered to a great extent, the P gain Kp and the I gain Ki are not switched from the ordinary constants Kp1 and Ki1 to the noise coping constants Kp2 and Ki2 during periods in which the vehicle travels at high speed, whereby deterioration of steering feel can be prevented.

Notably, the sixth control example may be modified in such a manner as to impart hysteresis to the control of changing the P gain Kp and the I gain Ki in accordance with the actual steering angle θ and the vehicle speed V. In this modification, in place of the gain-change-condition determination program of FIG. 22, the gain-change-condition determination section BL10 repeatedly executes, at predetermined short intervals, a program modified from the gain-change-condition determination program of FIG. 14.

In the program modified from the gain-change-condition determination program of FIG. 14, the gain-change-condition determination section BL10 acquires the vehicle speed V instead of the steering speed ω in step S41, and performs the determination processing of step S33c of FIG. 22 rather than the determination processing of step S49. Further, instead of performing the determination processing of step S50, the gain-change-condition determination section BL10 determines whether or not the vehicle speed V is greater than a predetermined vehicle speed V2 (e.g., 20 km/h), which is higher than the predetermined vehicle speed V1. When the vehicle speed V is greater than the predetermined vehicle speed V2, the gain-change-condition determination section BL10 proceeds to step S52. When the vehicle speed V is equal to or lower than the predetermined vehicle speed V2, the gain-change-condition determination section BL10 proceeds to step S53. Notably, in this case, the above-described steering-speed condition flag VFL is to be read as a vehicle-speed condition flag VFL.

As a result, in the modification of the sixth control example as well, the frequency of switching the P gain Kp and the I gain Ki for changes in the actual steering angle θ and the vehicle speed V is decreased. Accordingly, the frequent switching of the P gain Kp and the I gain Ki; i.e., the frequent switching of the drive current supplied to the electric motor 15, is mitigated, whereby generation of abnormal noise from the steering mechanism can be suppressed well.

g. Other Modifications

Other modifications of the above-described embodiments will be described. FIGS. 23 to 28 respectively show functional blocks of modifications of the above-described first to sixth embodiments. In these functional block diagrams, a low pass filter processing section BL12 is disposed in a stage following the respective P-gain setting section BL6 of the functional blocks of the first through sixth control examples shown in FIGS. 2, 8, 12, 16, 18, and 21. The low pass filter processing section BL12 successively acquires the P gain Kp and the I gain Ki set to the PI-gain setting section BL6, and outputs them to the P-gain control section BL4 and the I-gain control section BL5 after performing low-pass-filter processing on the P gain Kp and the I gain Ki.

By virtue of this configuration, the P gain Kp and the I gain Ki, by which the current error $\Delta I$ and its integral value $\int \Delta I dt$ are multiplied, are caused to change gradually, so that even when the P gain Kp and the I gain Ki are switched, the control voltage value $E_0$ changes smoothly, and the drive current flowing through the electric motor 15 also changes smoothly. Accordingly, even when the P gain Kp and the I gain Ki are switched, steering assist force generated by the electric motor 15 changes smoothly, and the driver does not feel unnatural sensation, which the driver would otherwise feel when rotating the steering wheel 11.

Moreover, the present invention is not limited to the above-described embodiments and modifications thereof, and various modifications may be employed within the scope of the present invention.

The invention claimed is:

1. A steering assist apparatus for a vehicle which includes an electric motor for imparting assist force to steering of steerable wheels performed through rotation of a steering wheel, wherein feedback control is performed, while an actual control quantity of the electric motor is used as a feedback, such that the electric motor operates in accordance with a target control quantity, the steering assist apparatus comprising:

a steering angle detection unit which detects a steering angle of the steering wheel; and a gain changing unit which changes a feedback gain used in the feedback control in accordance with the detected steering angle, wherein the gain changing unit changes the feedback gain to a first feedback gain when an absolute value of the detected steering angle is less than a predetermined steering angle and changes the feedback gain to a second feedback gain when the absolute value of the detected steering angle is greater than the predetermined steering angle.

2. A steering assist apparatus for a vehicle according to claim 1, wherein the feedback gain is a control gain regarding at least one of a proportional term or an integral term associated with the feedback control.

3. A steering assist apparatus for a vehicle according to claim 1, wherein when the detected steering angle is large, the gain changing unit changes the feedback gain to a smaller value as compared with the case where the detected steering angle is small, to thereby reduce abnormal noise which is generated due to high responsiveness of the feedback control.

4. A steering assist apparatus for a vehicle according to claim 1, wherein when the detected steering angle is large, the gain changing unit changes the feedback gain to a larger value as compared with the case where the detected steering angle is small, to thereby reduce abnormal noise which is generated due to low responsiveness of the feedback control.

5. A steering assist apparatus for a vehicle according to claim 1, wherein the target control quantity of the electric motor is a target current value, which represents target current to be supplied to the electric motor; and the actual control quantity of the electric motor is an actual current value, which represents current flowing through the electric motor and detected by a current sensor.

6. A steering assist apparatus for a vehicle according to claim 1, further comprising:
a steering torque detection unit which detects steering torque applied to the steering wheel;
a vehicle speed detection unit which detects vehicle speed; and
a target-control-quantity determination unit which determines the target control quantity of the electric motor in accordance with the detected steering torque and vehicle speed.

7. A steering assist apparatus for a vehicle according to claim 1,
further comprising:
a steering speed detection unit which detects steering speed of the steering wheel; and
a gain-change control unit which permits the gain changing unit to change the feedback gain when the steering speed detected by the steering speed detection unit is lower than a predetermined steering speed and prohibits the gain changing unit from changing the feedback gain when the detected steering speed is equal to or higher than the predetermined steering speed.

8. A steering assist apparatus for a vehicle according to claim 7, wherein hysteresis is imparted to the feedback-gain changing control performed by the gain changing unit and the gain-change control unit in accordance with changes in the steering angle detected by the steering angle detection unit and the steering speed detected by the steering speed detection unit.

9. A steering assist apparatus for a vehicle according to claim 5,
wherein the target current value decreases as the vehicle speed increases, and
wherein the steering assist apparatus further comprises a gain-change control unit which permits the gain changing unit to change the feedback gain when current flowing through the electric motor is greater than a predetermined current and prohibits the gain changing unit from changing the feedback gain when the current flowing through the electric motor is equal to or less than the predetermined current.

10. A steering assist apparatus for a vehicle according to claim 9, wherein hysteresis is imparted to the feedback-gain changing control performed by the gain changing unit and the gain-change control unit in accordance with changes in the steering angle detected by the steering angle detection unit and the current flowing through the electric motor.

11. A steering assist apparatus for a vehicle according to claim 6,
further comprising:
a current-change-rate detection unit which detects as a current change rate, the ratio of a change rate of the current flowing through the electric motor to a change rate of the steering torque detected by the steering torque detection unit; and
a gain-change control unit which permits the gain changing unit to change the feedback gain when the current change rate detected by the current-change-rate detection unit is greater than a predetermined change rate and prohibiting the gain changing unit from changing the feedback gain when the detected current change rate is equal to or less than the predetermined change rate.

12. A steering assist apparatus for a vehicle according to claim 11, wherein hysteresis is imparted to the feedback-gain changing control performed by the gain changing unit and the gain-change control unit in accordance with changes in the steering angle detected by the steering angle detection unit and the current change rate detected by the current-change-rate calculation unit.

13. A steering assist apparatus for a vehicle according to claim 6,
further comprising:
a gain-change control unit which permits the gain changing unit to change the feedback gain when the vehicle speed detected by the vehicle speed detection unit is lower than a predetermined vehicle speed and prohibits the gain changing unit from changing the feedback gain when the vehicle speed is equal to or higher than the predetermined vehicle speed.

14. A steering assist apparatus for a vehicle according to claim 13, wherein hysteresis is imparted to the feedback-gain changing control performed by the gain changing unit and the gain-change control unit in accordance with changes in the steering angle detected by the steering angle detection unit and the vehicle speed detected by the vehicle speed detection unit.

15. A steering assist apparatus for a vehicle according to claim 1, wherein the gain changing unit includes a low-pass-filter processing unit which performs low-pass-filter processing for the feedback gain changed in accordance with the steering angle.

16. A steering assist apparatus for a vehicle according to claim 1, further comprising a steering-angle determination unit which determines whether the absolute value of the detected steering angle is less than or greater than the predetermined steering angle and outputs a flag to the gain changing unit based on the determination.

* * * * *